US011675415B2

(12) United States Patent
Yardi et al.

(10) Patent No.: US 11,675,415 B2
(45) Date of Patent: *Jun. 13, 2023

(54) HIERARCHICAL POWER MANAGEMENT IN ARTIFICIAL REALITY SYSTEMS

(71) Applicant: Meta Platforms Technologies, LLC, Menlo Park, CA (US)

(72) Inventors: Shrirang Madhav Yardi, San Jose, CA (US); Alok Kumar Mathur, Cupertino, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/647,946

(22) Filed: Jan. 13, 2022

(65) Prior Publication Data

US 2022/0317760 A1 Oct. 6, 2022

Related U.S. Application Data

(63) Continuation of application No. 16/829,615, filed on Mar. 25, 2020, now Pat. No. 11,256,319.

(60) Provisional application No. 62/939,464, filed on Nov. 22, 2019.

(51) Int. Cl.
*G06F 1/3287* (2019.01)
*G06F 3/01* (2006.01)

(52) U.S. Cl.
CPC ............ *G06F 1/3287* (2013.01); *G06F 3/011* (2013.01); *G06F 3/017* (2013.01)

(58) Field of Classification Search
CPC ......... G06F 1/3287; G06F 3/011; G06F 3/017

USPC ......................................... 713/300, 320, 323
See application file for complete search history.

(56) References Cited

U.S. PATENT DOCUMENTS

| 11,256,319 | B2 * | 2/2022 | Yardi ..................... G06F 3/011 |
| 2016/0027218 | A1 | 1/2016 | Salter et al. |
| 2018/0125716 | A1 | 5/2018 | Cho et al. |
| 2019/0094949 | A1 | 3/2019 | Kurian et al. |
| 2019/0392558 | A1 | 12/2019 | Pouliquen et al. |

OTHER PUBLICATIONS

Hattori T., et al., "Hierarchical Power Distribution and Power Management Scheme for a Single Chip Mobile Processor," 43rd ACM/IEEE Design Automation Conference, IEEE, Piscataway, NJ, USA, Jul. 24-28, 2006, pp. 292-295.

(Continued)

*Primary Examiner* — Michael J Brown
(74) *Attorney, Agent, or Firm* — Shumaker & Sieffert, P.A.

(57) ABSTRACT

The disclosure describes artificial reality (AR) systems and techniques that enable hierarchical power management of multiple devices within a multi-device AR system. For example, a multi-device AR system includes a device comprising one of a peripheral device configured to generate artificial reality content for display or a head-mounted display unit (HMD) configured to output artificial reality content. The device comprises a System on a Chip (SoC) that includes a host subsystem and plurality of subsystems. Each subsystem includes a child energy processing unit configured to manage power states for the subsystem. The host subsystem includes a parent energy processing unit configured to direct power management of each of the child energy processing units of the plurality of subsystems.

19 Claims, 13 Drawing Sheets

(56) References Cited

OTHER PUBLICATIONS

International Preliminary Report on Patentability for International Application No. PCT/US2020/057900, dated Jun. 2, 2022, 9 pages.
International Search Report and Written Opinion for International Application No. PCT/US2020/057900, dated Mar. 5, 2021, 11 Pages.
Nathuji R., et al., "Virtual Power: Coordinated Power Management in Virtualized Enterprise Systems," Proceeding SOSP '07, ACM SOSP, Proceeding of the ACM Symposium on Operating System Principles, Association for Computing Machinery, Oct. 14-17, 2007, 14 pages.
Prosecution History from U.S. Appl. No. 16/829,615, dated Mar. 25, 2020 through Oct. 12, 2021, 34 pp.

* cited by examiner

HIERARCHICAL POWER MANAGEMENT IN ARTIFICIAL REALITY SYSTEMS

RELATED APPLICATIONS

This application is a continuation of U.S. patent application Ser. No. 16/829,615, filed Mar. 25, 2020, which claims the benefit of U.S. Provisional Patent Application No. 62/939,464, filed on Nov. 22, 2019, the entire contents of which are incorporated by reference herein.

TECHNICAL FIELD

The disclosure generally relates to power management of devices of artificial reality systems, such as augmented reality, mixed reality, and/or virtual reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality, an augmented reality, a mixed reality, a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may entirely comprise content that is generated by the system or may include generated content combined with captured content (e.g., real-world video and/or images). During operation, the user typically interacts with the artificial reality system to select content, launch applications, configure the system and, in general, experience artificial reality environments.

SUMMARY

In general, the disclosure describes hierarchical power management of multi-device artificial reality (AR) systems. An example multi-device AR system includes a system in which a peripheral device operates as a co-processing AR device when paired with one or more head-mounted displays (HMDs). In some examples, as further described herein, the peripheral device and each HMD may each include a distributed system including one or more subsystems such as System on a Chip (SoC) integrated circuits (referred to herein as "SoCs") that are collectively configured to provide an artificial reality application execution environment. System components of SoCs, such as processors and system buses, support a discrete set of power states, such as different voltage or frequency operating points, clock gates states, power gates states, etc. Components of SoCs may be placed in idle, low power, or powered off states to conserve power of the devices that include the SoCs. The techniques described herein enable hierarchical power management of the distributed system of devices in an AR system.

In one example, a hierarchical power management system may include one or more child energy processing units ("child EPUs") that provide localized management of subsystems of the distributed system and a parent energy processing unit ("parent EPU") to manage the power management decisions of the child EPUs. Child EPUs may locally manage power states of components of SoCs based on triggers (e.g., explicit and implicit power state triggers) to enter or exit power states (e.g., off, standby, etc.) for the system components. Child EPUs may in this way provide fine-grained power management for themselves. The parent EPU may sequence child EPU power domains and/or arbitrate and sequence dynamic voltage and frequency scaling (DVFS) requests. The techniques may be particularly advantageous by distributing the power management to child EPUs such that a central power manager, e.g., the parent EPU, is not burdened with having to know the power states of each component of a distributed system and to control each component of the distributed system, which burdens the central power manager.

The techniques may provide one or more technical advantages for realizing at least one practical application. The hierarchical power management divides roles between system-level power management and subsystem-level power management subsystem to provides specific, component-level power management decisions (e.g., via the child EPUs) while maintaining a coordinated power management scheme (e.g., via the parent EPU). The child EPU, in coordination with local subsystem microprocessors defining different subsystem power states, provide for more fine-grained power management decisions than a central power management scheme. This facilitates lower latency control of the power domains. This also facilitates greater modularity between different designs of a particular subsystem. The parent EPU, in coordination with a system-level microprocessor defining different power states of the system, provides operational management and power management for system level components.

In another example, a multi-device AR system includes a device comprising one of a peripheral device configured to generate artificial reality content for display or a head-mounted display unit (HMD) configured to output artificial reality content. The device comprises a System on a Chip (SoC) that includes a host subsystem and plurality of subsystems. Each subsystem includes a child energy processing unit configured to manage power states for the subsystem. The host subsystem includes a parent energy processing unit configured to direct power management of each of the child energy processing units of the plurality of subsystems.

In another example, a method includes receiving, by a peripheral device of an artificial reality system, one or more inputs from a user of the artificial reality system. The peripheral device comprises one or more Systems on a Chip (SoCs). The method also includes outputting, by a head mounted display (HMD) of the artificial reality system, artificial reality content. The HMD comprises one or more SoCs. Additionally, the method includes managing, by one or more child energy processing units, power states for respective subsystems of the SoCs of the peripheral device and respective subsystems of the SoCs of the HMD. The method also includes directing, by a parent energy processing unit, power management of the one or more child energy processing units to manage power of the artificial reality system.

In another example, a computer-readable storage medium comprises instructions that, when executed, configure an artificial reality system to receive, by a peripheral device of an artificial reality system, one or more inputs from a user of the artificial reality system. The peripheral device comprises one or more Systems on a Chip (SoCs). The instructions, when executed, further cause the artificial reality system to output, by a head mounted display (HMD) of the artificial reality system, artificial reality content. The HMD comprises one or more SoCs. The instructions, when executed, further cause the artificial reality system to manage, by one or more child energy processing units, power states for respective subsystem of the SoCs of the peripheral device and respective subsystems of the SoCs of the HMD. The instructions, when executed, further cause the artificial reality system to direct, by a parent energy processing unit, power management of the one or more child energy processing units to manage power usage of the artificial reality system.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the text and figures.

DETAILED DESCRIPTION

Figure 1A:
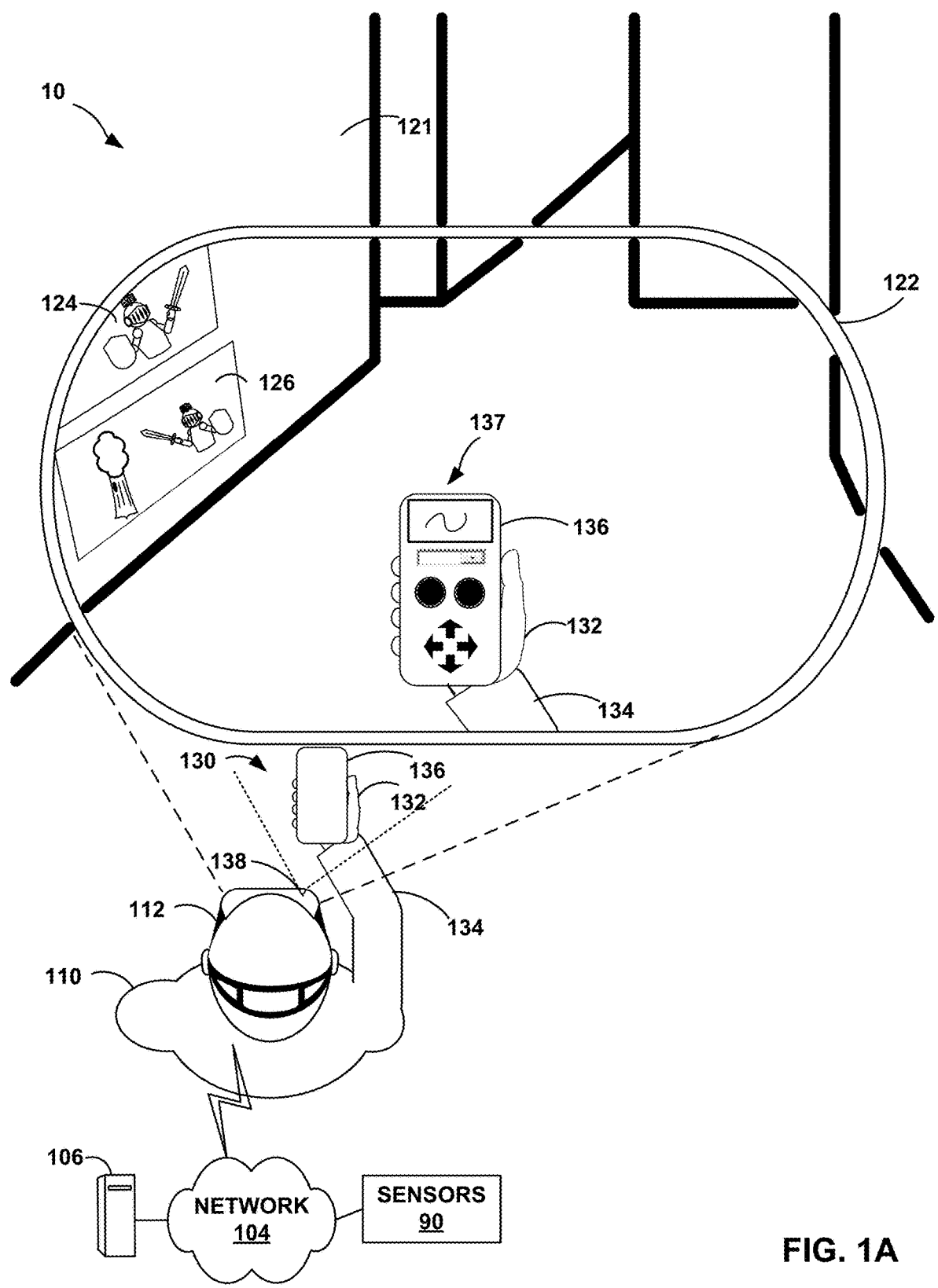
FIG. 1A is an illustration depicting an example multi-device artificial reality system that enables hierarchical power management, in accordance with the techniques described in this disclosure.

Mobile devices such as laptops and cellular phones use complex power management techniques to manage power at the system level. Typically, this is done by selectively placing parts of the system in idle, low power or powered off states depending on their utilization for the usage scenario. System components such as processors (CPUs or MCUs), graphical processors (GPUs), image processors, and system buses, etc. are designed to support a discrete set of "power states" that allow a runtime tradeoff between power consumed and performance delivered by the device. The power states may include, for example, (a) different voltage/frequency operating points, (b) different clock gated states, and (c) different power gated states. These states may be referred to as "knobs" that can be controlled. A typical power management system consists of a set of policies executed by a "power manager". Policies are hardware or software algorithms that manage the power/performance tradeoffs using available power states. The power manager can be one or combination of (a) hardware state machines, (b) a dedicated microcontroller running power management firmware, (c) a power management driver within the operating system (OS) running on one of the CPU cores. Most conventional systems implement a discrete set of power states controlled by a central power manager. Table 1 below shows an example of such power states for a contemporary phone or laptop system.

TABLE 1

| System Power | Description | Entry/Exit Triggers | Features Supported |
|---|---|---|---|
| State Mechanical Off (G3) | Fully powered down. Requires full reboot | explicit power down/power up | n/a |
| Soft off (S5) | System "appears off". Requires cold boot. Some wake devices are powered. Context lost. | explicit user trigger | All but some wake devices are powered off |
| Hibernate (S4) | System "appears off". Requires warm boot. Some wake devices are powered. Context restore from NVM. Faster wakeup than soft off | explicit user trigger | All but some wake devices are powered off. Context saved in NVM |
| Sleep (S1-S3) | Different levels of shallow/deep power down states. System can quickly respond to wake events. | detect different activity levels. FW and HW decide state | Various depending on state. Tradeoff b/w wakeup time and power saved |
| Working (S0) | System full usable. Power managed using performance states (P-states) | SW and FW policies decide different P-states | All features of the system are available |

In a typical power management system, from the OS perspective, the whole system is in a single overall system state.

Consequently, the OS needs to be aware of the entire device tree and its states so it can manage the overall system state. These system power states have explicit entry and exit triggers from either hardware or software and transitions between system states are well defined and visible to the OS. In such a power management system, devices have limited autonomy for power management decisions. For example, some devices (typically only the CPU and/or the GPU) may have a limited ability to decide the voltage/frequency at which they operate. But other states, such as power gating, are controlled by the central power manager.

Mixed reality headsets have requirements that a typical user device, such as a laptop or smart phone does not have. These headsets provide at least as much performance as a contemporary cellphone with a fraction of the power budgets due to thermal limitations. Furthermore, additional features provided by mixed reality headsets affect power management. For example, laptops and smartphones are episodic use devices with explicit user triggers that result in a particular use case scenario, such as having a "home button" pressed, or launching an application, etc. Episodic behavior allows definition of explicit power states and explicit triggers to transition between states. In contrast, mixed reality systems are an "always ON" system that receive and act on non-user-initiated triggers. For example, detecting an audio signal, detecting an image, or being at a certain location may be a trigger that requires an action from the mixed reality system. In an always-ON system, the transition between "idle" or "on" or "off" states not as defined and are difficult to characterize for a central power manager.

Mixed reality devices are an n-body, distributed compute system. For example, a mixed reality system may span a headset, a staging or peripheral device, and a cloud computing component (i.e., a 3-body system). However, within the different components, the same use case can be implemented in multiple ways. For example, one component may use a digital signal processing (DSP) core and another component may use a hardware accelerator to perform a substantially similar operation. Additionally, mixed reality headsets have different computing requirements than traditional CPU-centric system-on-chip (SoC) systems. To improve power efficiency, for example, mixed reality headsets uses a variety of hardware accelerators (HWAs) and DSPs, which may each include microcontroller units (MCUs). A central CPU may be aware of low-level computing decisions delegated to local MCUs. As a consequence, the knobs for performance/power tradeoff are not limited to a single, well-defined set of devices. This increases the search space and requirements for a central power manager. For example, in traditional power management policies, there is a single well-defined entry and exit trigger for each state and a well-defined transition to a new state. However, for a mixed reality system, since the triggers can be implicit, there can be multiple transitions depending on the trigger. For example, an explicit trigger may be the user saying a particular keyword, but the transition may depend on what the user actually said. In such an example, a different set of subsystems may need to be turned ON to service the users' request if the user asks for location information versus asking for information about an object.

In accordance with techniques of this disclosure, a hierarchical power management for mixed reality systems provides one or more of (a) a power management architecture that supports more fine-grained states instead of general control states, (b) power management decisions being performed in a distributed manner, and/or (c) power management policies that account for the power tradeoff possibilities of a distributed system to promote power efficiency. As described below, a parent EPU manages child EPUs integrated into different subsystems of one or more SoCs of the mixed reality system such that the parent EPU does not need to be aware of how the child EPU manages the subsystem. The SoCs and subsystems represent a collection of specialized integrated circuits arranged in a distributed architecture and configured to provide an operating environment for artificial reality applications. As examples, SoC integrated circuits may include, in subsystems, specialized functional blocks operating as co-application processors, sensor aggregators, encryption/decryption engines, security processors, hand/eye/depth tracking and pose computation elements, video encoding and rendering engines, display controllers and communication control components. The child EPUs within each subsystem manage different power domains within the one or more subsystems of the SoCs to account for functions of the particular subsystem. The power management facilitated by the parent and child EPUs provide fine-grained hierarchical state control of the mixed reality system with each child EPU having its own power state machine that notifies the parent EPU of conditions and pushes settings down to the various power domains to control the triggers and transitions between states of its own power state machine.

FIG. 1A is an illustration depicting an example multi-device artificial reality system that enables hierarchical power management, in accordance with the techniques described in this disclosure. In the example of FIG. 1A, artificial reality system 10 includes HMD 112, peripheral device 136, and may in some examples include one or more external sensors 90 and/or console 106.

As shown, HMD 112 is typically worn by user 110 and comprises an electronic display and optical assembly for presenting artificial reality content 122 to user 110. In addition, HMD 112 includes one or more sensors (e.g., accelerometers) for tracking motion of the HMD 112 and may include one or more image capture devices 138 (e.g., cameras, line scanners) for capturing image data of the surrounding physical environment. Although illustrated as a head-mounted display, AR system 10 may alternatively, or additionally, include glasses or other display devices for presenting artificial reality content 122 to user 110.

In this example, console 106 is shown as a single computing device, such as a gaming console, workstation, a desktop computer, or a laptop. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, 3D physical environment to render artificial reality content 122 for display to user 110. In the example of FIG. 1A, a user 110 views the artificial reality content 122 constructed and rendered by an artificial reality application executing on HMD 112 and/or console 106. In some examples, artificial reality content 122 may comprise a mixture of real-world imagery (e.g., hand 132, peripheral device 136, walls 121) and virtual objects (e.g., virtual content items 124, 126 and virtual user interface 137) to produce mixed reality and/or augmented reality. In some examples, virtual content items 124, 126 may be mapped (e.g., pinned, locked, placed) to a particular position within artificial reality content 122. A position for a virtual content item may be fixed, as relative to one of wall 121 or the earth, for instance. A position for a virtual content item may be variable, as relative to peripheral device 136 or a user, for instance. In some examples, the particular position of a virtual content item within artificial reality content 122 is associated with a position within the real-world, physical environment (e.g., on a surface of a physical object).

In this example, peripheral device 136 is a physical, real-world device having a surface on which AR system 10 overlays virtual user interface 137. Peripheral device 136 may include one or more presence-sensitive surfaces for detecting user inputs by detecting a presence of one or more objects (e.g., fingers, stylus) touching or hovering over locations of the presence-sensitive surface. In some examples, peripheral device 136 may include an output display, which may be a presence-sensitive display. In some examples, peripheral device 136 may be a smartphone, tablet computer, personal data assistant (PDA), or other hand-held device. In some examples, peripheral device 136 may be a smartwatch, smartring, or other wearable device. Peripheral device 136 may also be part of a kiosk or other stationary or mobile system. Peripheral device 136 may or may not include a display device for outputting content to a screen.

In the example artificial reality experience shown in FIG. 1A, virtual content items 124, 126 are mapped to positions on wall 121. The example in FIG. 1A also shows that virtual content item 124 partially appears on wall 121 only within artificial reality content 122, illustrating that this virtual content does not exist in the real world, physical environment. Virtual user interface 137 is mapped to a surface of peripheral device 136. As a result, AR system 10 renders, at a user interface position that is locked relative to a position of peripheral device 136 in the artificial reality environment, virtual user interface 137 for display at HMD 112 as part of artificial reality content 122. FIG. 1A shows that virtual user interface 137 appears on peripheral device 136 only within artificial reality content 122, illustrating that this virtual content does not exist in the real-world, physical environment.

The artificial reality system 10 may render one or more virtual content items in response to a determination that at least a portion of the location of virtual content items is in the field of view 130 of user 110. For example, artificial reality system 10 may render a virtual user interface 137 on peripheral device 136 only if peripheral device 136 is within field of view 130 of user 110.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 10 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. As illustrated in FIG. 1A, the artificial reality application may render images of real-world objects, such as the portions of peripheral device 136, hand 132, and/or arm 134 of user 110, that are within field of view 130 along the virtual objects, such as within artificial reality content 122. In other examples, the artificial reality application may render virtual representations of the portions of peripheral device 136, hand 132, and/or arm 134 of user 110 that are within field of view 130 (e.g., render real-world objects as virtual objects) within artificial reality content 122. In either example, user 110 is able to view the portions of their hand 132, arm 134, peripheral device 136 and/or any other real-world objects that are within field of view 130 within artificial reality content 122. In other examples, the artificial reality application may not render representations of the hand 132 or arm 134 of the user.

During operation, artificial reality system 10 performs object recognition within image data captured by image capture devices 138 of HMD 112 to identify peripheral device 136, hand 132, including optionally identifying individual fingers or the thumb, and/or all or portions of arm 134 of user 110. Further, artificial reality system 10 tracks the position, orientation, and configuration of peripheral device 136, hand 132 (optionally including particular digits of the hand), and/or portions of arm 134 over a sliding window of time. In some examples, peripheral device 136 includes one or more sensors (e.g., accelerometers) for tracking motion or orientation of the peripheral device 136.

As described above, multiple devices of artificial reality system 10 may work in conjunction in the AR environment, where each device may be a separate physical electronic device and/or separate integrated circuits (e.g., System-on-Chip (SoC)) within one or more physical devices. In this example, peripheral device 136 is operationally paired with HMD 112 to jointly operate within AR system 10 to provide an artificial reality experience. For example, peripheral device 136 and HMD 112 may communicate with each other as co-processing devices. As one example, when a user performs a user interface gesture in the virtual environment at a location that corresponds to one of the virtual user interface elements of virtual user interface 137 overlaid on the peripheral device 136, the AR system 10 detects the user interface and performs an action that is rendered to HMD 112.

In accordance with the techniques of this disclosure, artificial reality system 10 may provide hierarchical power management of multiple devices of the AR environment, such as peripheral device 136 and/or one or more HMDs, e.g., HMD 112. Although the techniques described herein are described with respect to hierarchical power management of a peripheral device 136 and one or more HMDs, the techniques may apply to any devices of a distributed system in AR system 10.

In some example implementations, as described herein, peripheral device 136 and HMD 112 may each include System on a Chip (SoC) integrated circuits configured to support an artificial reality application. SoC integrated circuits may include specialized functional blocks (sometimes referred to herein as "subsystems" of the SoC) operating as co-application processors, sensor aggregators, encryption/decryption engines, hand/eye/depth tracking and pose computation elements, video encoding and rendering engines, display controllers and communication control components, or others. System components of SoC subsystems, such as processors (e.g., central processing unit (CPU), graphic processing unit (GPU), etc.) and system buses, support a discrete set of power states, such as different voltage or frequency operating points, clock gates states, power gates states, etc. In this example, subsystems of the SoCs may be managed by one or more child energy processing units ("child EPUs") located on the SoCs (e.g., sub-system of the distributed system), and the one or more child EPUs are managed by a parent energy processing unit ("parent EPU"). For example, an SoC subsystem operating as a sensor aggregator may include a child EPU to locally manage power states of components of the SoC subsystem, such as local clocks and local power domains. Similarly, an SoC subsystem operating as a display controller may include a child EPU to locally manage power states of components of the SoC subsystem, and so on. In some examples, multiple functional blocks of the SoC may be included in different power domains of the same subsystem. The parent EPU may manage the power management decisions of the child EPUs, such as management of power management decisions of the distributed system. For example, parent EPU may arbitrate power management between the SoCs, sequence child EPU power domains, sequence dynamic voltage and frequency scaling (DVFS) requests, etc.

As described further below, parent EPU and child EPUs may manage different power states including an off state, standby state, glance state, location based or vision-based discovery state, etc. The power states may be triggered based on explicit power state triggers, implicit power state triggers, or a combination of both. For example, explicit power state triggers may include explicit user actions, such as pressing the power button to power off a device, interacting with the presence sensitive surface of peripheral device 136, a user saying a particular keyword, etc. Implicit power state triggers may include location-based tracking, such as tracking hand 132 of user 112 and determining that hand 132 is within proximity to artificial reality content.

Figure 1B:
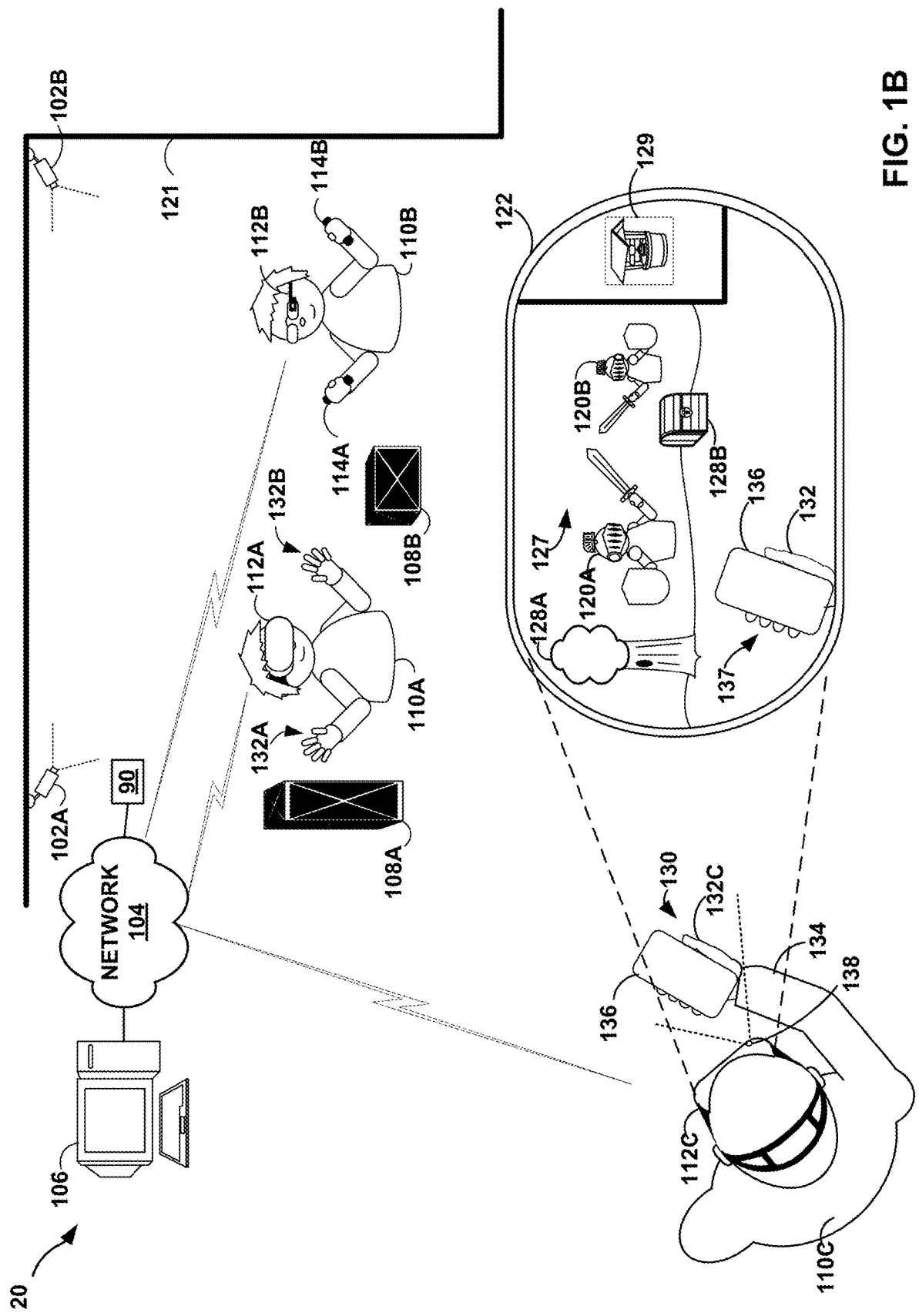
FIG. 1B is an illustration depicting an example artificial reality system that enables hierarchical power management, in accordance with techniques described in this disclosure.

FIG. 1B is an illustration depicting another example artificial reality system 20 that enables hierarchical power management of multiple devices in accordance with the techniques described in this disclosure. Similar to artificial reality system 10 of FIG. 1A, in some examples, artificial reality system 20 of FIG. 1B may generate and render virtual content items with respect to a virtual surface within a multi-user artificial reality environment. Artificial reality system 20 may also, in various examples, generate and render certain virtual content items and/or graphical user interface elements to a user in response to detection of one or more particular interactions with peripheral device 136 by the user. For example, the peripheral device 136 may act as a stage device for the user to "stage" or otherwise interact with a virtual surface.

In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), console 106, and sensors 90. As shown in FIG. 1B, artificial reality system 20 represents a multi-user environment in which an artificial reality application executing on console 106 and/or HMDs 112 presents artificial reality content to each of users 110A-110C (collectively, "users 110") based on a current viewing perspective of a corresponding frame of reference for the respective user. That is, in this example, the artificial reality application constructs artificial content by tracking and computing pose information for a frame of reference for each of HMDs 112. Artificial reality system 20 uses data received from cameras 102, HMDs 112, and controllers 114 to capture 3D information within the real world environment, such as motion by users 110 and/or tracking information with respect to users 110 and objects 108, for use in computing updated pose information for a corresponding frame of reference of HMDs 112. As one example, the artificial reality application may render, based on a current viewing perspective determined for HMD 112C, artificial reality content 122 having virtual objects 128A-128B (collectively, "virtual objects 128") as spatially overlaid upon real world objects 108A-108B (collectively, "real world objects 108"). Further, from the perspective of HMD 112C, artificial reality system 20 renders avatars 120A, 120B based upon the estimated positions for users 110A, 110B, respectively.

Each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may operate substantially similar to HMD 112 of FIG. 1A by tracking hand 132 and/or arm 134 of user 110C and rendering the portions of hand 132 that are within field of view 130 as virtual hand 132 within artificial reality content 122. HMD 112B may receive user inputs from controllers 114 held by user 110B. In some examples, controller 114A and/or 114B can correspond to peripheral device 136 of FIG. 1A and operate substantially similar to peripheral device 136 of FIG. 1A. HMD 112A may also operate substantially similar to HMD 112 of FIG. 1A and receive user inputs in the form of gestures performed on or with peripheral device 136 by of hands 132A, 132B of user 110A. HMD 112B may receive user inputs from controllers 114 held by user 110B. Controllers 114 may be in communication with HMD 112B using near-field communication of short-range wireless communication such as Bluetooth, using wired communication links, or using other types of communication links.

In a manner similar to the examples discussed above with respect to FIG. 1A, console 106 and/or HMD 112C of artificial reality system 20 generates and renders a virtual surface comprising virtual content item 129 (e.g., GIF, photo, application, live-stream, video, text, web-browser, drawing, animation, 3D model, representation of data files (including two-dimensional and three-dimensional datasets), or any other visible media), which may be overlaid upon the artificial reality content 122 displayed to user 110C when the portion of wall 121 associated with virtual content item 129 comes within field of view 130 of HMD 112C. As shown in FIG. 1B, in addition to or alternatively to image data captured via camera 138 of HMD 112C, input data from external cameras 102 may be used to track and detect particular motions, configurations, positions, and/or orientations of peripheral device 136 and/or hands and arms of users 110, such as hand 132 of user 110C, including movements of individual and/or combinations of digits (fingers, thumb) of the hand.

In some aspects, the artificial reality application can run on console 106, and can utilize image capture devices 102A and 102B to analyze configurations, positions, and/or orientations of hand 132B to identify input gestures that may be performed by a user of HMD 112A. Similarly, HMD 112C can utilize image capture device 138 to analyze configurations, positions, and/or orientations of peripheral device 136 and hand 132C to input gestures that may be performed by a user of HMD 112C. In some examples, peripheral device 136 includes one or more sensors (e.g., accelerometers) for tracking motion or orientation of the peripheral device 136. The artificial reality application may render virtual content items and/or UI elements, responsive to such gestures, motions, and orientations, in a manner similar to that described above with respect to FIG. 1A.

Image capture devices 102 and 138 may capture images in the visible light spectrum, the infrared spectrum, or other spectrum. Image processing described herein for identifying objects, object poses, and gestures, for example, may include processing infrared images, visible light spectrum images, and so forth.

Devices of artificial reality system 20 may work in conjunction in the AR environment. For example, peripheral device 136 is paired with HMD 112C to jointly operate within AR system 20. Similarly, controllers 114 are paired with HMD 112B to jointly operate within AR system 20. Peripheral device 136, HMDs 112, and controllers 114 may each include one or more SoC integrated circuits configured to enable an operating environment for artificial reality applications.

In accordance with the techniques of this disclosure, artificial reality system 20 may provide hierarchical power management of multiple devices of the AR environment, such as peripheral device 136 and/or HMDs 112A-112C. Although the techniques described herein are described with respect to hierarchical power management of a peripheral device 136 and one or more HMDs, the techniques may apply to any devices that may be paired in AR system 20.

In some example implementations, as described herein, peripheral device 136, HMDs 112, and controllers 114 may each include one or more SoCs configured to support an artificial reality application, such as SoCs operating as co-application processors, sensor aggregators, display controllers, etc. In this example, SoCs of the devices may be managed by a parent energy processing unit ("parent EPU") and one or more child EPUs located on the SoCs (e.g., sub-system of the distributed system). For example, child EPUs of SoCs in controllers 114 may locally manage power of components of the SoC in controllers 114, child EPUs of SoCs in HMDs 112A-112C may locally manage power of components of local SoCs, and child EPUs of SoCs in peripheral device 136 may locally manage power of components of the SoCs. The parent EPU may manage the power management decisions of the child EPUs of SoCs in devices such as HMDs 112, peripheral device 136, and/or controllers 14. For example, parent EPU may arbitrate power management between the SoCs, order child EPU power domains, order dynamic voltage and frequency scaling (DVFS) requests, etc.

As described further below, a parent EPU and child EPUs may manage power states including an off state, standby state, glance state, location based or vision-based discovery state, etc. The power states may be triggered based on explicit power state triggers, implicit power state triggers, or a combination of both. For example, explicit power state triggers may include explicit user actions, such as pressing the power button to power off a device, interacting with the presence sensitive surface of peripheral device 136, etc. Implicit power state triggers may include tracking hand 132 of user 112 and determining that hand 132 is within proximity to artificial reality content.

Figure 2A:
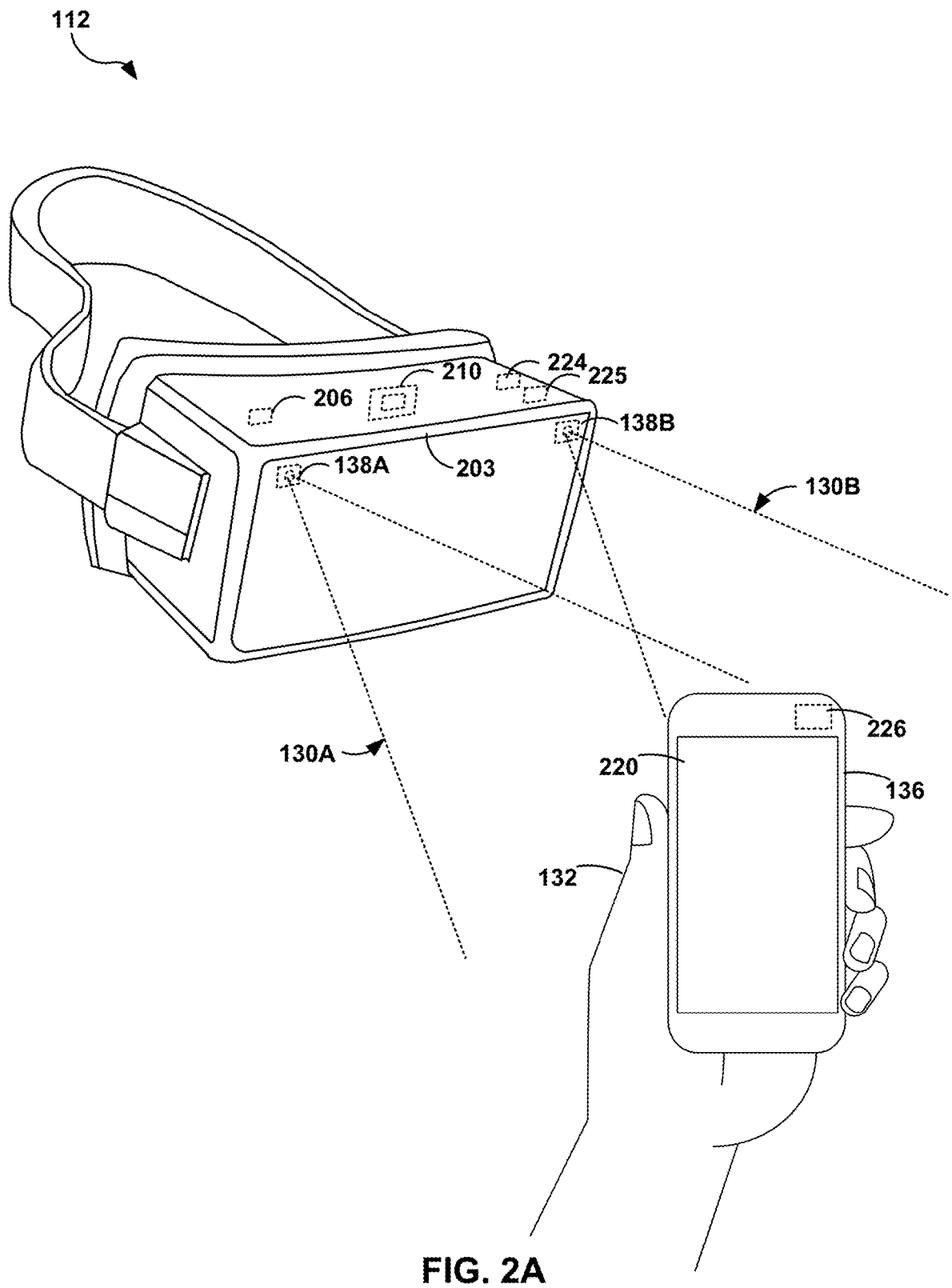
FIG. 2A is an illustration depicting an example HMD and an example peripheral device that enables sec hierarchical power management, in accordance with techniques described in this disclosure.

FIG. 2A is an illustration depicting an example HMD 112 and an example peripheral device 136 that enables hierarchical power management, in accordance with techniques described in this disclosure. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects (including peripheral device 136 and/or hand 132) in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In one example, control unit 210 is configured to, based on the sensed data (e.g., image data captured by image capture devices 138 and/or 102, position information from GPS sensors), generate and render for display on display 203 a virtual surface comprising one or more virtual content items (e.g., virtual content items 124, 126 of FIG. 1A) associated with a position contained within field of view 130A, 130B of image capture devices 138. As explained with reference to FIGS. 1A-1B, a virtual content item may be associated with a position within a virtual surface, which may be associated with a physical surface within a real-world environment, and control unit 210 can be configured to render the virtual content item (or portion thereof) for display on display 203 in response to a determination that the position associated with the virtual content (or portion therefore) is within the current field of view 130A, 130B. In some examples, a virtual surface is associated with a position on a planar or other surface (e.g., a wall), and control unit 210 will generate and render the portions of any virtual content items contained within that virtual surface when those portions are within field of view 130A, 130B.

In one example, control unit 210 is configured to, based on the sensed data, identify a specific gesture or combination of gestures performed by the user and, in response, perform an action. For example, in response to one identified gesture, control unit 210 may generate and render a specific user interface for display on electronic display 203 at a user interface position locked relative to a position of the peripheral device 136. For example, control unit 210 can generate and render a user interface including one or more UI elements (e.g., virtual buttons) on surface 220 of peripheral device 136 or in proximity to peripheral device 136 (e.g., above, below, or adjacent to peripheral device 136). Control unit 210 may perform object recognition within image data captured by image capture devices 138 to identify peripheral device 136 and/or a hand 132, fingers, thumb, arm or another part of the user, and track movements, positions, configuration, etc., of the peripheral device 136 and/or identified part(s) of the user to identify pre-defined gestures performed by the user. In response to identifying a pre-defined gesture, control unit 210 takes some action, such as selecting an option from an option set associated with a user interface (e.g., selecting an option from a UI menu), translating the gesture into input (e.g., characters), launching an application, manipulating virtual content (e.g., moving, rotating a virtual content item), generating and rendering virtual markings, generating and rending a laser pointer, or otherwise displaying content, and the like. For example, control unit 210 can dynamically generate and present a user interface, such as a menu, in response to detecting a pre-defined gesture specified as a "trigger" for revealing a user interface (e.g., turning peripheral device to a landscape or horizontal orientation (not shown)). In some examples, control unit 210 detects user input, based on the sensed data, with respect to a rendered user interface (e.g., a tapping gesture performed on a virtual UI element). In some examples, control unit 210 performs such functions in response to direction from an external device, such as console 106, which may perform object recognition, motion tracking and gesture detection, or any part thereof.

As an example, control unit 210 can utilize image capture devices 138A and 138B to analyze configurations, positions, movements, and/or orientations of peripheral device 136, hand 132 and/or arm 134 to identify a user interface gesture, selection gesture, stamping gesture, translation gesture, rotation gesture, drawing gesture, pointing gesture, etc., that may be performed by users with respect to peripheral device 136. The control unit 210 can render a UI menu (including UI elements) and/or a virtual surface (including any virtual content items) and enable the user to interface with that UI menu and/or virtual surface based on detection of a user interface gesture, selection gesture, stamping gesture, translation gesture, rotation gesture, and drawing gesture performed by the user with respect to the peripheral device, as described in further detail below.

In one example, surface 220 of peripheral device 136 is a presence-sensitive surface, such as a surface that uses capacitive, conductive, resistive, acoustic, or other technology to detect touch and/or hover input. In some examples, surface 220 of peripheral device 136 is a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). In such an example, peripheral device 136 can render a user interface or other virtual elements (e.g., virtual markings) on touchscreen 220 and detect user input (e.g., touch or hover input) on touchscreen 220. In that example, peripheral device 136 can communicate any detected user input to HMD 112 (and/or console 106 of FIG. 1A) using wireless communications links (e.g., Wi-Fi, near-field communication of short-range wireless communication such as Bluetooth), using wired communication links (not shown), or using other types of communication links. In some examples, peripheral device can include one or more input devices (e.g., buttons, trackball, scroll wheel) for interacting with virtual content (e.g., to select a virtual UI element, scroll through virtual UI elements).

In this example, HMD 112 includes a parent EPU 224 and one or more child EPUs 225. Although the parent EPU 224 is illustrated as being in HMD 112, parent EPU 224 may be included in peripheral device 136 or another device of the AR system. Peripheral device 136 includes one or more child EPUs 226.

Similar to the example described in FIGS. 1A-1B, child EPUs 225 may manage power (e.g., local clocks and power domains) of SoCs of HMD 112, and child EPUs 226 may manage power of SoCs of peripheral device 136. The parent EPU 224 may manage the power management decisions of the child EPUs 225 and 226. For example, parent EPU may arbitrate power management between the SoCs, order child EPU power domains, order dynamic voltage and frequency scaling (DVFS) requests, etc.

As described further below, parent EPU 224 and child EPUs 225, 226 may manage power states including an off state, standby state, glance state, location based or vision-based discovery state, etc. The power states may be triggered based on explicit power state triggers, implicit power state triggers, or a combination of both. For example, explicit power state triggers may include explicit user actions, such as pressing the power button to power off a device, interacting with the presence sensitive surface of peripheral device 136, etc. Implicit power state triggers may include tracking hand 132 of user 112 and determining that hand 132 is within proximity to artificial reality content.

Figure 2B:
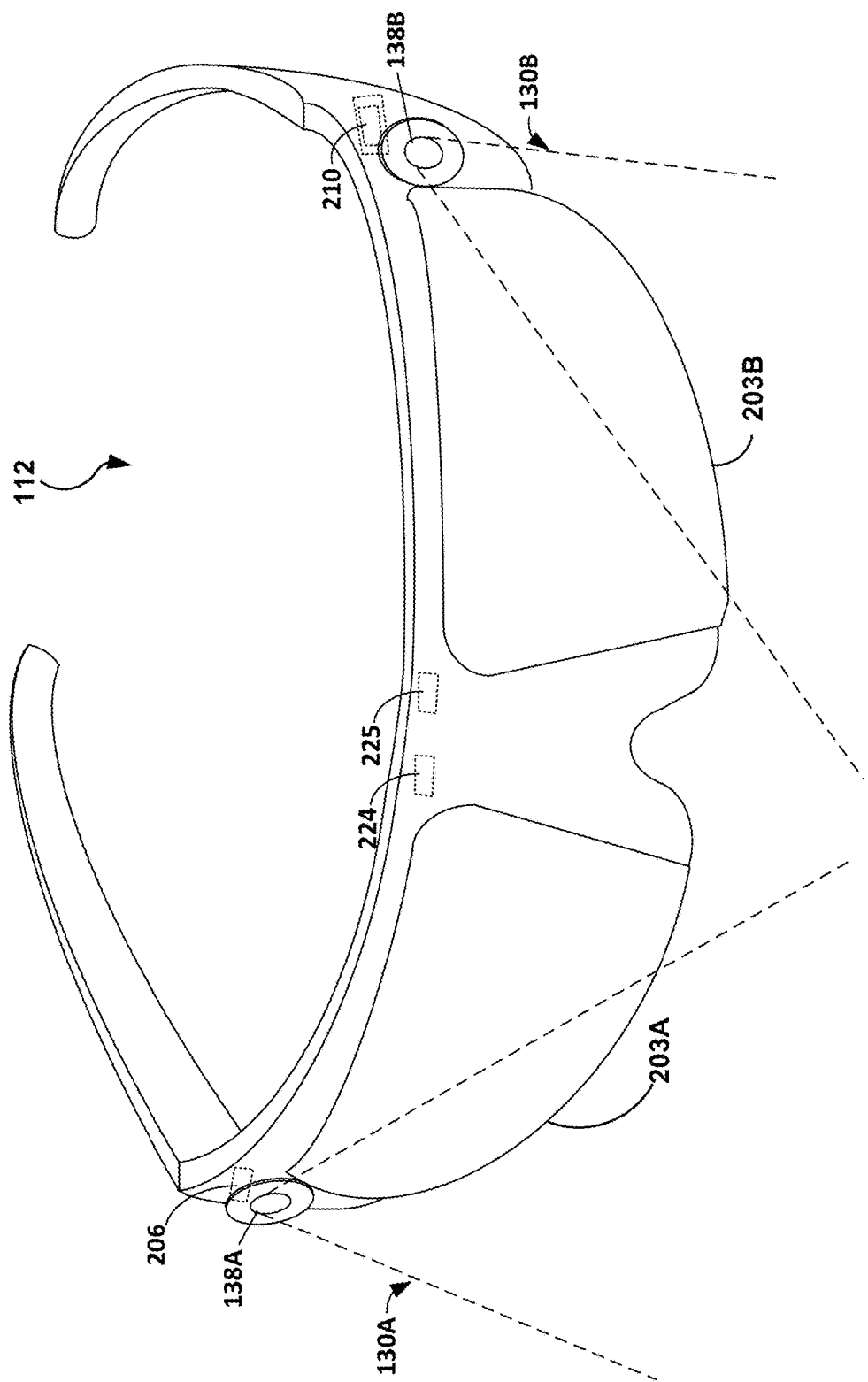
FIG. 2B is an illustration depicting another example HMD, in accordance with techniques described in this disclosure.

FIG. 2B is an illustration depicting another example HMD 112, in accordance with techniques described in this disclosure. As shown in FIG. 2B, HMD 112 may take the form of glasses. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. HMD 112 includes an internal control unit 210, which may include an internal power source and one or more printed-circuit boards having one or more processors, memory, and hardware to provide an operating environment for executing programmable operations to process sensed data and present artificial reality content on display 203.

Similar to the example illustrated in FIG. 2A, HMD 112 includes a parent EPU 224 and one or more child EPUs 225. Although the parent EPU 224 is illustrated as being in HMD 112, parent EPU 224 may be included in peripheral device 136 or another device of the AR system.

Similar to the example described in FIG. 2A, child EPUs 225 may manage power (e.g., local clocks and power domains) of SoCs of HMD 112. The parent EPU 224 may manage the power management decisions of the child EPUs 225 and child EPUs of other devices in the AR system. For example, parent EPU may arbitrate power management between the SoCs, order child EPU power domains, order dynamic voltage and frequency scaling (DVFS) requests, etc.

As described further below, parent EPU 224 and child EPUs 225 may manage power states including an off state, standby state, glance state, location based or vision-based discovery state, etc. The power states may be triggered based on explicit power state triggers, implicit power state triggers, or a combination of both. For example, explicit power state triggers may include explicit user actions, such as pressing the power button to power off a device, interacting with the presence sensitive surface of peripheral device 136, etc. Implicit power state triggers may include tracking hand 132 of user 112 and determining that hand 132 is within proximity to artificial reality content.

Figure 3:
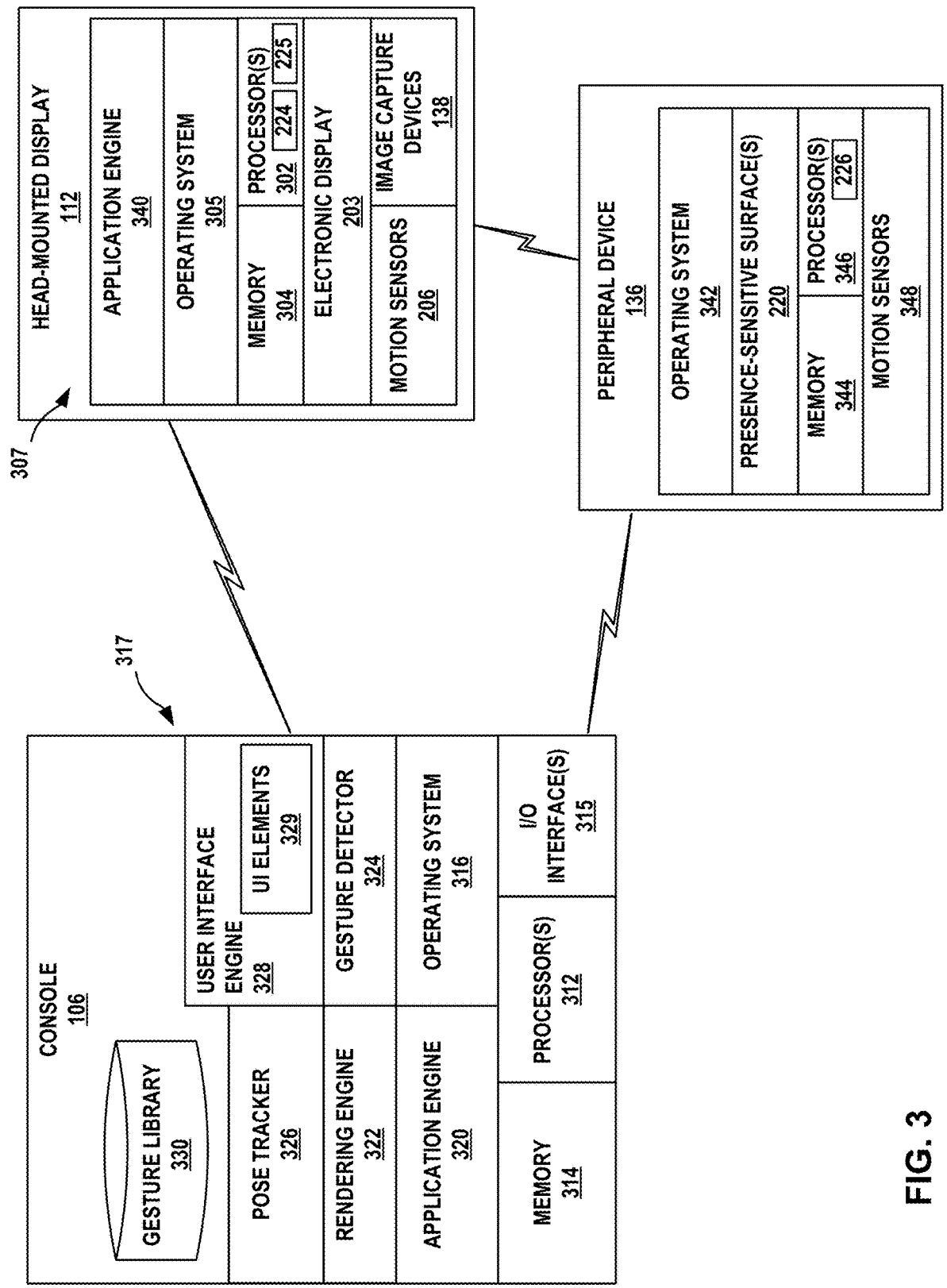
FIG. 3 is a block diagram showing example implementations of a console, an HMD, and a peripheral device of the multi-device artificial reality systems of FIGS. 1A, 1B, in accordance with techniques described in this disclosure.

FIG. 3 is a block diagram showing example implementations of console 106, HMD 112, and peripheral device 136 of multi-device artificial reality system 10, 20 of FIGS. 1A, 1B, in accordance with techniques described in this disclosure. In the example of FIG. 3, console 106 performs pose tracking, gesture detection, and user interface and virtual surface generation and rendering for HMD 112 based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to electronic display 203, motion sensors 206 and image capture devices 138. In some examples, processors 302 and memory 304 may be separate, discrete components. In other examples, memory 304 may be on-chip memory collocated with processors 302 within a single integrated circuit. As discussed with respect to the example of FIGS. 2A and 2B, processors 302 may include a security processor to provide secure device attestation and mutual authentication of HMD 112 when pairing with devices, e.g., peripheral device 136, used in conjunction within the AR environment.

In general, console 106 is a computing device that processes image and tracking information received from cameras 102 (FIG. 1B) and/or image capture devices 138 of HMD 112 (FIGS. 1A, 2A, 2B) to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, peripheral devices, and the like. Moreover, the one or more I/O interfaces 315 may include one or more wired or wireless network interface controllers (NICs) for communicating with a network, such as network 104.

Software applications 317 of console 106 operate to provide an overall artificial reality application. In this example, software applications 317 include application engine 320, rendering engine 322, gesture detector 324, pose tracker 326, and user interface engine.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1B), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Pose tracker 326 may determine a current pose for peripheral device 136 and, in accordance with the current pose, triggers certain functionality associated with any rendered virtual content (e.g., places a virtual content item onto a virtual surface, manipulates a virtual content item, generates and renders one or more virtual markings, generates and renders a laser pointer). In some examples, pose tracker 326 detects whether the HMD 112 is proximate to a physical position corresponding to a virtual surface (e.g., a virtual pinboard), to trigger rendering of virtual content.

User interface engine 328 is configured to generate virtual user interfaces for rendering in an artificial reality environment. User interface engine 328 generates a virtual user interface to include one or more virtual user interface elements 329, such as a virtual drawing interface, a selectable menu (e.g., drop-down menu), virtual buttons, a directional pad, a keyboard, or other user-selectable user interface elements, glyphs, display elements, content, user interface controls, and so forth. Rendering engine 322 is configured to render, based on a current pose for peripheral device 136, the virtual user interface at a user interface position, in the artificial reality environment, that is locked relative to a position of peripheral device 136 in the artificial reality environment. The user interface position may be a position of one of presence-sensitive surfaces 220, and rendering engine 322 may scale, rotate, and otherwise transform the virtual user interface to apply projection to match the pose, size, and perspective of the presence-sensitive surface 220 such that the virtual user interface appears, in the artificial reality environment, to be overlaid on the presence-sensitive surface 220. User interface engine 328 may generate virtual user interface to be partially transparent, allowing presence-sensitive surface 220 to be seen by the user. This degree of transparency may be configurable.

Console 106 may output this virtual user interface and other artificial reality content, via a communication channel, to HMD 112 for display at HMD 112. Rendering engine 322 receives pose information for peripheral device 136 to continually update the user interface position and pose to match that of the peripheral device 136, such as that of one of presence-sensitive surfaces 220.

Based on the sensed data from any of the image capture devices 138 or 102, presence-sensitive surfaces 220, or other sensor devices, gesture detector 324 analyzes the tracked motions, configurations, positions, and/or orientations of peripheral device 136 and/or objects (e.g., hands, arms, wrists, fingers, palms, thumbs) of the user to identify one or more gestures performed by user 110. More specifically, gesture detector 324 analyzes objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. In some examples, gesture detector 324 may track movement, including changes to position and orientation, of the peripheral device 136, hand, digits, and/or arm based on the captured image data, and compare motion vectors of the objects to one or more entries in gesture library 330 to detect a gesture or combination of gestures performed by user 110. In some examples, gesture detector 324 may receive user inputs detected by presence-sensitive surface(s) of peripheral device and process the user inputs to detect one or more gestures performed by user 110 with respect to peripheral device 136.

Gesture detector 324 and gesture library 330 may be distributed, in whole or in part, to peripheral device 136 to process user inputs on peripheral device 136 to detect gestures. In such cases, presence-sensitive surface(s) 220 detects user inputs at locations of the surface. Peripheral device 136 executing gesture detector 324 can process the user inputs to detect one or more gestures of gesture library 330. Peripheral device 136 may send indications of the detected gestures to console 106 and/or HMD 112 to cause the console 106 and/or HMD 112 to responsively perform one or more actions. Peripheral device 136 may alternatively, or additionally, send indications of the user inputs at locations of the surface to console 106, and gesture detector 324 may process the user inputs to detect one or more gestures of gesture library 330.

Some entries in gesture library 330 may each define a gesture as a series or pattern of motion, such as a relative path or spatial translations and rotations of peripheral device 136, a user's hand, specific fingers, thumbs, wrists and/or arms. Some entries in gesture library 330 may each define a gesture as a configuration, position, and/or orientation of the peripheral device, user's hand and/or arms (or portions thereof) at a particular time, or over a period of time. Some entries in gesture library 330 may each define a gesture as one or more user inputs, over time, detected by presence-sensitive surface(s) 220 of peripheral device 136. Other examples of type of gestures are possible. In addition, each of the entries in gesture library 330 may specify, for the defined gesture or series of gestures, conditions that are required for the gesture or series of gestures to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

Each of the entries in gesture library 330 further may specify, for each of the defined gestures or combinations/series of gestures, a desired response or action to be performed by software applications 317. For example, certain specialized gestures may be pre-defined such that, in response to detecting one of the pre-defined gestures, user interface engine 328 dynamically generates a user interface as an overlay to artificial reality content being displayed to the user, thereby allowing the user 110 to easily invoke a user interface for configuring HMD 112 and/or console 106 even while interacting with artificial reality content. In other examples, certain gestures may be associated with other actions, such as providing input, selecting virtual objects (including virtual content items and/or UI elements), translating (e.g., moving, rotating) virtual objects, altering (e.g., scaling, annotating) virtual objects, making virtual markings, launching applications, and the like.

As an example, gesture library 330 may include entries that describe a peripheral device gesture, such as user interface activation gesture, a menu scrolling gesture, a selection gesture, a stamping gesture, a translation gesture, rotation gesture, drawing gesture, and/or pointing gesture. Gesture detector 324 may process image data from image capture devices 138 to analyze configurations, positions, motions, and/or orientations of peripheral device 136 and/or a user's hand to identify a user interface gesture, selection gesture, stamping gesture, translation gesture, rotation gesture, drawing gesture, pointing gesture, etc. that may be performed by users with respect to peripheral device 136. For example, the rendering engine 322 can render a pinboard user interface based on detecting, by the gesture detector 324, of the user interface gesture being performed and detecting, by the pose tracker 326, that the HMD 112 is proximate to a physical position corresponding to a virtual position of the virtual pinboard. The user interface engine 328 can define the menu that is displayed and can control actions that are performed in response to selections caused by selection gestures.

In the example shown in FIG. 3, peripheral device 136 includes one or more processors 346 and memory 344 that, in some examples, provide a computer platform for executing an operating system 342, which may be an embedded, real-time multitasking operating system, for instance, or other type of operating system. In turn, operating system 346 provides a multitasking operating environment for executing one or more software components. In some examples, peripheral device 136 includes one or more presence-sensitive surfaces 220 (e.g., one or more surfaces that use capacitive, conductive, resistive, acoustic, and/or other technology to detect touch and/or hover input). In one or more aspects, peripheral device 136 can be configured to detect touch and/or hover input at presence-sensitive surface 220, process that input (e.g., at processors 346) and communicate the touch and/or hover input and communicate information about that input (including location information about that input) to console 106 and/or HMD 112. As discussed with respect to the example of FIG. 2A, presence-sensitive surface(s) 220 can comprise a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). As further shown in FIG. 3, in this example, peripheral device 136 further includes one or more motion sensors 348, such as one or more accelerometers (also referred to as IMUs) that output data indicative of current acceleration of peripheral device 136, GPS sensors that output data indicative of a location or position of peripheral device, radar or sonar that output data indicative of distances of peripheral device 136 from various objects (e.g., from a wall or other surface), or other sensors that provide indications of a location, position, and/or orientation of peripheral device or other objects within a physical environment. In some examples, processors 346 are coupled to presence-sensitive surface(s) 220 and motion sensors 246. In some examples, processors 346 and memory 344 may be separate, discrete components. In other examples, memory 344 may be on-chip memory collocated with processors 346 within a single integrated circuit. In one or more aspects, peripheral device 136 can coexist with the HMD and, in some example, operate as an auxiliary input/output device for the HMD in the virtual environment. In some examples, the peripheral device 136 may operate as an artificial reality co-processing device to which some of the functions of the HMD are offloaded. In one or more aspects, peripheral device 136 can be a smartphone, tablet, or other hand-held device.

In some examples, each of processors 302, 312, 346 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314, 344 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

In accordance with the techniques described herein, the multi-device artificial reality system of FIG. 3 enables hierarchical power management of multiple devices of an AR system.

In this example, processors 302 of HMD 112 include a parent EPU 224 and one or more child EPUs 225. Although the parent EPU 224 is illustrated as being in HMD 112, parent EPU 224 may be included in peripheral device 136 or another device of the AR system.

Child EPUs 225 may manage power (e.g., local clocks and power domains) of subsystems of SoCs of HMD 112. For example, child EPUs 225 may manage a subsystem operating as a sensor aggregator for motion sensors 206 and/or image capture devices 138, a subsystem operating as a display controller for electronics display 203, or subsystems of other local SoCs of HMD 112 configured to provide an operating environment for an artificial reality environment.

In this example, processors 346 of peripheral device 136 includes one or more child EPUs 226. Child EPUs 226 may manage power (e.g., local clocks and power domains) of subsystems of peripheral device 136. For example, child EPU 226 may manage a subsystem operating as a sensor aggregator for presence-sensitive surface(s) 220 and/or motion sensors 348, and other local subsystems of peripheral device 136 configured to provide an operating environment for the artificial reality environment.

As described further below, parent EPU 224 and child EPUs 225, 226 may manage power states including an off state, standby state, glance state, location based or vision-based discovery state, etc. The power states may be triggered based on explicit power state triggers, implicit power state triggers, or a combination of both. For example, explicit power state triggers may include explicit user actions, such as pressing the power button to power off a device, interacting with the presence sensitive surface of peripheral device 136, etc. Implicit power state triggers may include tracking hand 132 of user 112 and determining that hand 132 is within proximity to artificial reality content.

Figure 4:
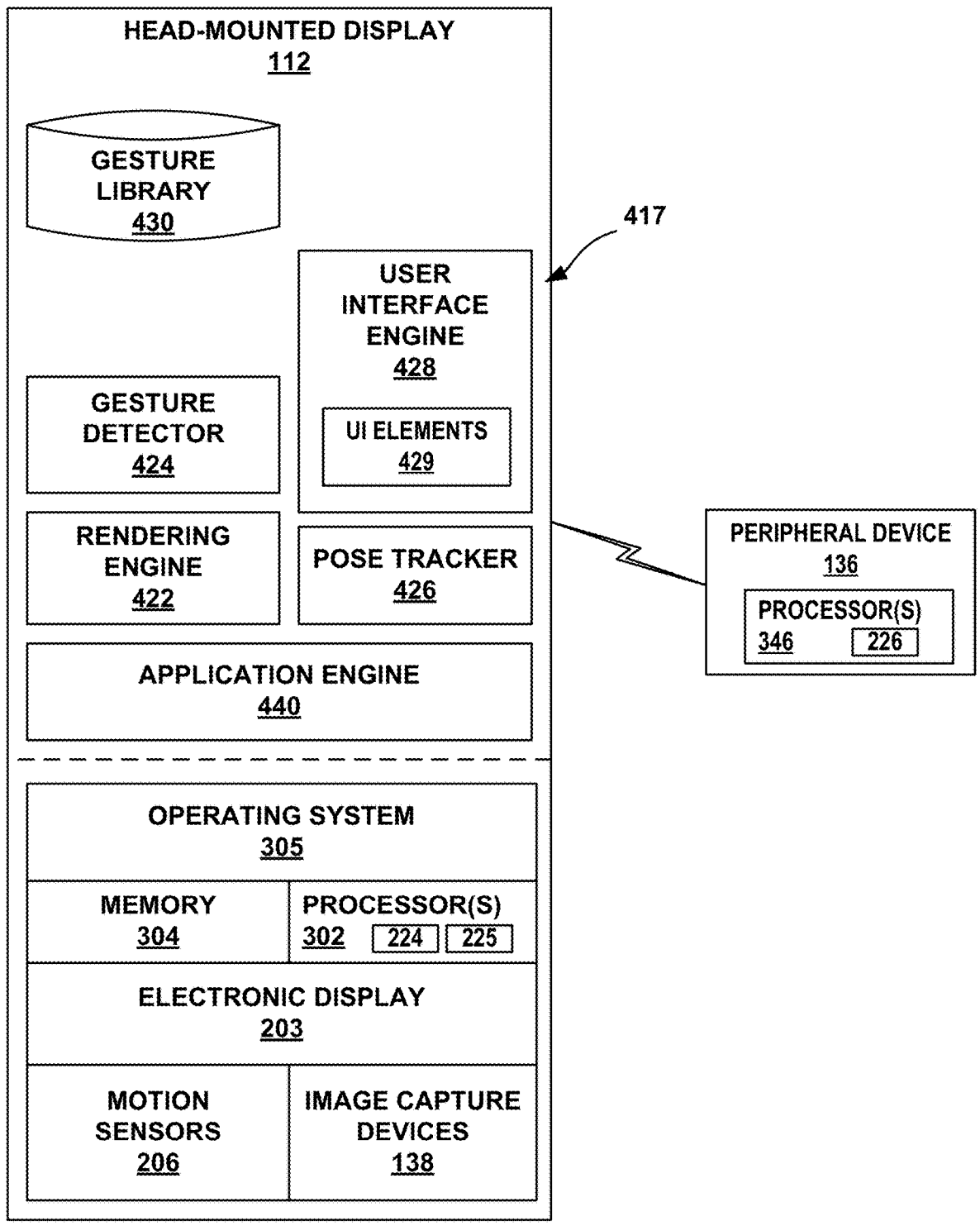
FIG. 4 is a block diagram showing example implementations of a console, an HMD, and a peripheral device of the multi-device artificial reality systems of FIGS. 1A, 1B, in accordance with techniques described in this disclosure.

FIG. 4 is a block diagram showing example implementations of a console, an HMD, and a peripheral device of the multi-device artificial reality systems of FIGS. 1A, 1B, in accordance with techniques described in this disclosure.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 138.

In the example of FIG. 4, software components 417 operate to provide an overall artificial reality application. In this example, software applications 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct virtual user interfaces overlaid on, or as part of, the artificial content for display to user 110.

Similar to the examples described with respect to FIG. 3, based on the sensed data from any of the image capture devices 138 or 102, presence-sensitive surfaces of peripheral device 136, or other sensor devices, gesture detector 424 analyzes the tracked motions, configurations, positions, and/or orientations of peripheral device 136 and/or objects (e.g., hands, arms, wrists, fingers, palms, thumbs) of the user to identify one or more gestures performed by user 110.

More specifically, gesture detector 424 may analyze objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. A virtual surface application generates virtual surfaces as part of, e.g., overlaid upon, the artificial reality content to be displayed to user 110 and/or performs actions based on one or more gestures or combinations of gestures of user 110 detected by gesture detector 424. Gesture detector 424 may analyze objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. In some examples, gesture detector 424 may track movement, including changes to position and orientation, of the peripheral device 136, hand, digits, and/or arm based on the captured image data, and compare motion vectors of the objects to one or more entries in gesture library 430 to detect a gesture or combination of gestures performed by user 110. In some examples, gesture detector 424 may receive user inputs detected by presence-sensitive surface(s) of peripheral device and process the user inputs to detect one or more gestures performed by user 110 with respect to peripheral device 136. Gesture library 430 is similar to gesture library 330 of FIG. 3. Some of all of the functionality of gesture detector 424 may be executed by peripheral device 136.

Similar to the example described in FIG. 3, processors 302 of HMD 112 include a parent EPU 224 and one or more child EPUs 225. Although the parent EPU 224 is illustrated as being in HMD 112, parent EPU 224 may be included in peripheral device 136 or another device of the AR system.

Child EPUs 225 may manage power (e.g., local clocks and power domains) of subsystems of SoCs of HMD 112. For example, child EPUs 225 may manage a subsystem operating as a sensor aggregator for motion sensors 206 and/or image capture devices 138, a subsystem operating as a display controller for electronics display 203, or subsystems of HMD 112 configured to provide an operating environment for an artificial reality environment.

In this example, processors 346 of peripheral device 136 includes one or more child EPUs 226. Child EPUs 226 may manage power (e.g., local clocks and power domains) of subsystems of peripheral device 136. For example, child EPU 226 may manage a subsystem operating as a sensor aggregator for presence-sensitive surface(s) 220 and/or motion sensors 348, and other subsystems of SoCs of peripheral device 136 configured to provide an operating environment for the artificial reality environment.

As described further below, parent EPU 224 and child EPUs 225, 226 may manage power states including an off state, standby state, glance state, location based or vision-based discovery state, etc. The power states may be triggered based on explicit power state triggers, implicit power state triggers, or a combination of both. For example, explicit power state triggers may include explicit user actions, such as pressing the power button to power off a device, interacting with the presence sensitive surface of peripheral device 136, etc. Implicit power state triggers may include tracking hand 132 of user 112 and determining that hand 132 is within proximity to artificial reality content.

Figure 5:
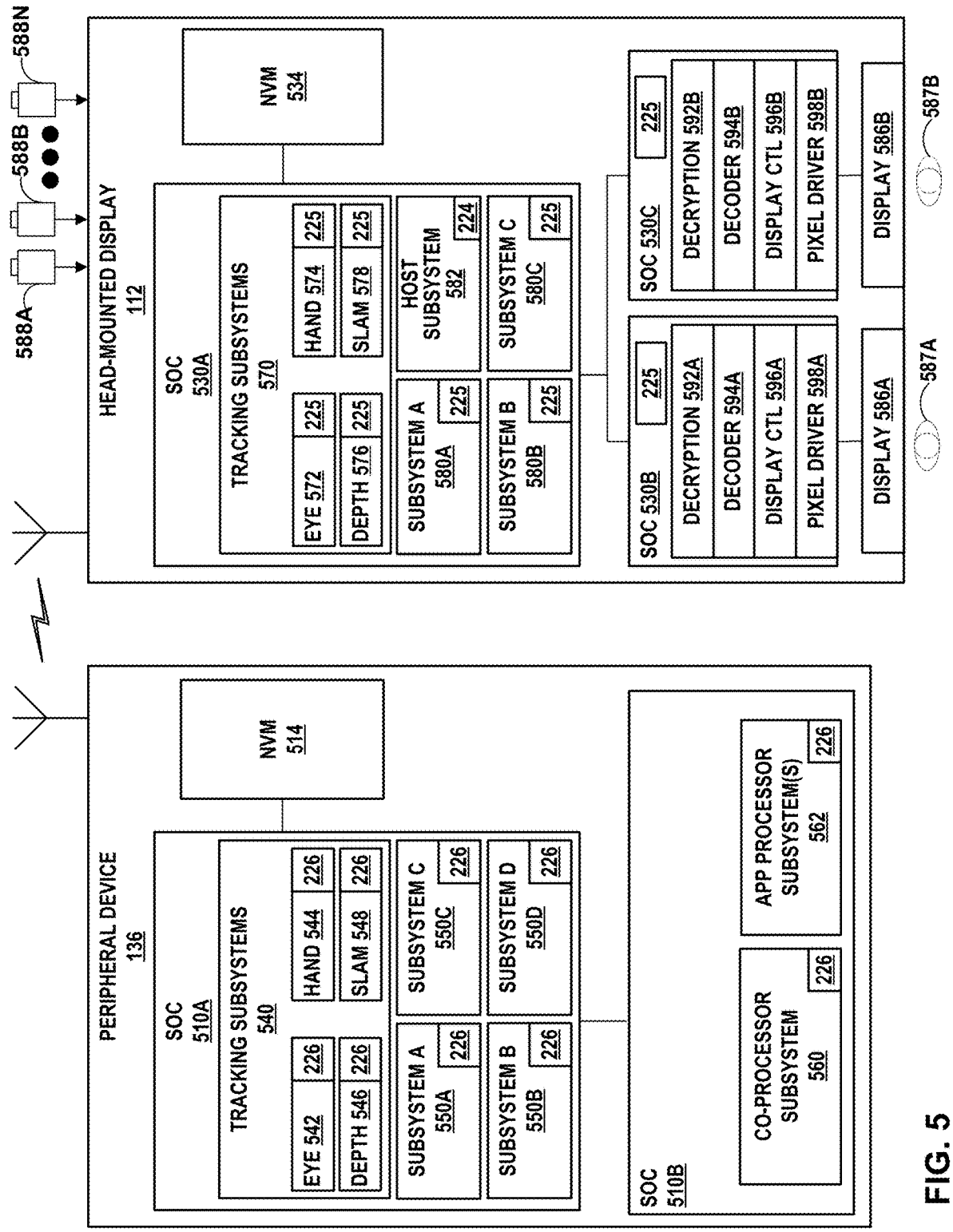
FIG. 5 is a block diagram illustrating an example implementation of hierarchical power management in a distributed architecture for a multi-device artificial reality system in which one or more devices (e.g., peripheral device and HMD) are implemented using one or more SoC integrated circuits within each device, in accordance with the techniques described in this disclosure.

FIG. 5 is a block diagram illustrating an example implementation of hierarchical power management in a distributed architecture for a multi-device artificial reality system in which one or more devices (e.g., HMD 112 and peripheral device 136) are implemented using one or more SoC integrated circuits within each device. While FIG. 5 illustrates HMD 112 and peripheral device 136, the hierarchical power management may be implemented in any other device of an AR system of FIGS. 1A-4. In general, the SoCs illustrated in FIG. 5 represent a collection of specialized integrated circuits arranged in a distributed architecture, where each SoC integrated circuit includes various specialized functional blocks configured to provide an operating environment for artificial reality applications. FIG. 5 merely illustrates one example arrangement of SoC integrated circuits. The distributed architecture for a multi-device artificial reality system may include any collection and/or arrangement of SoC integrated circuits.

In this example, HMD 112 includes SoCs 510A and 510B (collectively, "SoCs 510"), parent EPU 224, one or more child EPUs 225A and 225B (collectively "child EPUs 225"), and one or more components as described below. Peripheral device 136 includes SoCs 530A and 530B (collectively, "SoCs 530"), one or more child EPUs 226A and 226B (collectively "child EPUs 226"), and one or more components as described below. In the example of FIG. 5, a hierarchical power management system is provided by parent EPU 224 and one or more child EPUs 225 and 226. Power states may include an off state, standby state, glance state, location based/vision-based discovery state, and others. Entry and/or exit triggers to the power states may include explicit power state triggers, implicit power state triggers, and/or a combination of both.

In this example, SoC 530A of HMD 112 comprises functional blocks including tracking subsystems 570, various other subsystems 580A-580C (collectively, "subsystems 580"), and host subsystem 582. Tracking subsystems 570 include, for example, an eye tracking subsystem 572 ("eye 572"), a hand tracking subsystem 574 ("hand 574"), a depth tracking subsystem 576 ("depth 576"), and/or a Simultaneous Localization and Mapping (SLAM) subsystem 578 ("SLAM 578"). For example, HMD 112 may receive input from one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 588A-588N (collectively, "image capture devices 588"). Image capture devices may include video cameras, laser scanners, Doppler radar scanners, depth scanners, or the like, configured to output image data representative of the physical environment. More specifically, image capture devices capture image data representative of objects (including peripheral device 136 and/or hand) in the physical environment that are within a field of view of image capture devices, which typically corresponds with the viewing perspective of HMD 112. Based on the sensed data and/or image data, tracking 570 determines, for example, a current pose for the frame of reference of HMD 112 and, in accordance with the current pose, renders the artificial reality content.

Subsystems 580 and 582 provide specialized functions for HMD 112. Subsystems 580 and 582 may include, for example, security processing, graphics processing, an interface processing, audio processing, and/or display processing, etc. For examples, an encryption/decryption subsystem may encrypt outgoing data communicated to peripheral device 136 and decrypts incoming data communicated from HMD 112 and may support symmetric key cryptography, or other cryptography techniques to encrypt/decrypt data. A co-application processors subsystem may include various processors such as a video processing unit, graphics processing unit, digital signal processors, encoders and/or decoders, and/or others to process, for example, surface and texture data received from the peripheral device 136. Interface subsystems may include one or more interfaces for connecting to functional blocks of SoC 530A. As one example, an interface subsystem may include peripheral component interconnect express (PCIe) slots. SoC 530A may connect with SoC 530B, 530C using an interface subsystem. For example, SoC 530A may connect with a communication device (e.g., radio transmitter) using an interface subsystem for communicating with other devices, e.g., peripheral device 136.

SoCs 530B and 530C each represents display controllers for outputting artificial reality content on respective displays, e.g., displays 586A, 586B (collectively, "displays 586"). In this example, SoC 530B may include a display controller for display 568A to output artificial reality content for a left eye 587A of a user. For example, SoC 530B includes a decryption block 592A, decoder block 594A, display controller 596A, and/or a pixel driver 598A for outputting artificial reality content on display 586A. Similarly, SoC 530C may include a display controller for display 568B to output artificial reality content for a right eye 587B of the user. For example, SoC 530C includes decryption 592B, decoder 594B, display controller 596B, and/or a pixel driver 598B for generating and outputting artificial reality content on display 586B. Displays 568 may include Light-Emitting Diode (LED) displays, Organic LEDs (OLEDs), Quantum dot LEDs (QLEDs), Electronic paper (E-ink) displays, Liquid Crystal Displays (LCDs), or other types of displays for displaying AR content.

Peripheral device 136 includes SoCs 510A and 510B configured to support an artificial reality application. In this example, SoC 510A comprises functional blocks including tracking subsystems 540 and various other subsystems 550A-550D (collectively "subsystems 550"). Tracking subsystems 540 include, for example, an eye tracking subsystem 542 ("eye 542"), a hand tracking subsystem 544 ("hand 544"), a depth tracking subsystem 546 ("depth 546"), and/or Simultaneous Localization and Mapping (SLAM) subsystem 548 ("SLAM 548"). For example, peripheral device 136 may receive input from one or more accelerometers (also referred to as inertial measurement units or "IMUs") that output data indicative of current acceleration of peripheral device 136, GPS sensors that output data indicative of a location of peripheral device 136, radar or sonar that output data indicative of distances of peripheral device 136 from various objects, or other sensors that provide indications of a location or orientation of peripheral device 136 or other objects within a physical environment. Peripheral device 136 may in some examples also receive image data from one or more image capture devices, such as video cameras, laser scanners, Doppler radar scanners, depth scanners, or the like, configured to output image data representative of the physical environment. Based on the sensed data and/or image data, tracking block 540 determines, for example, a current pose for the frame of reference of peripheral device 136 and, in accordance with the current pose, renders the artificial reality content to HMD 112.

Subsystems 550 provide specialized functions for peripheral device 136. Subsystems 550 may include, for example, security processing, graphics processing, an interface processing, audio processing, and/or display processing, etc. For examples, an encryption/decryption subsystem may encrypt outgoing data communicated to HMD 112, decrypt incoming data communicated from HMD 112, and may support symmetric key cryptography, or other cryptography techniques to encrypt/decrypt data. A display processor subsystem includes one or more processors such as a video processing unit, graphics processing unit, encoders and/or decoders, and/or others, for rendering artificial reality content to HMD 112. Interface subsystems include one or more interfaces for connecting to SoC 510A. As one example, an interface subsystem may include peripheral component interconnect express (PCIe) slots. SoC 510A may connect with SoC 510B using interface a subsystem. SoC 510A may connect with one or more communication devices (e.g., radio transmitter) using an interface subsystem for communicating with other devices, e.g., HMD 112.

SoC 510B includes co-application processors 560 and application processors 562. In this example, co-application processors 560 includes various processors, such as a vision processing unit (VPU), a graphics processing unit (GPU), and/or central processing unit (CPU). Application processors 562 may include a processing unit for executing one or more artificial reality applications to generate and render, for example, a virtual user interface to a surface of peripheral device 136 and/or to detect gestures performed by a user with respect to peripheral device 136.

As described above, HMD 112 includes parent EPU 224. Although parent EPU 224 is illustrated as included in HMD 112, parent EPU 224 may be included in peripheral device 136 or other devices of the AR system. Specifically, in the illustrated example, parent EPU 224 is within a host subsystem 582 of SoC 530A. In this example, tracking subsystems 570 may each have a child EPU 225, subsystems 550 may each have a child EPU 225, and SoCs 530A and 530C may each have respective child EPU modules 225. Similarly, subsystems 540 and 550 of SoC 510A of peripheral device 136 may each include child EPU 226. Subsystems of SoC 510B may also include child EPUs 226. Alternatively, in some examples, both HMD 112 and peripheral device 136 may include a host subsystem 582 with a parent EPU 224 configured to control child EPUs on the specific device.

Child EPUs 225 may manage power (e.g., local clocks and power domains) of subsystems 580 of the SoCs of HMD 112, and child EPU modules 226 may manage power of subsystems 550 and 560 of SoCs of peripheral device 136. The parent EPU module 224 may manage the power management decisions of the child EPUs 225 and 226. For example, parent EPU may arbitrate power management between the SoCs, order child EPU power domains, order dynamic voltage and frequency scaling (DVFS) requests, etc. As described below, parent EPU 224 and child EPU 225 and 226 include startup, shutdown, and control functions configured for the subsystems in which they reside.

As described above, parent EPU 224 and child EPU 225 and 226 may manage power states including an off state, standby state, glance state, location based or vision-based discovery state, etc. Parent EPU 224 coordinates power states of multiple subsystems to place the multi-device artificial reality system into a certain state. Child EPUs 225 and 226 manage state machines configured for the corresponding subsystem and executes sequences of steps to transitions the subsystem between the power states as defined by the state machine. These state machines may be specifically configured to account for the specific hardware and/or firmware used to provide the functionality of the subsystem. The power states may be triggered based on explicit power state triggers (sometimes referred to as "explicit inputs"), implicit power state triggers (sometimes referred to as "implicit inputs"), or a combination of both. For example, explicit power state triggers may include explicit user actions, such as pressing the power button to power off a device, interacting with the presence sensitive surface of peripheral device 136, etc. Implicit power state triggers may include tracking hand 132 of user 112 and determining that hand 132 is within proximity to artificial reality content. Table 2 below includes example power states, with a mixture of explicit and implicit power state triggers, that may be implemented by the multi-device artificial reality system of FIG. 5.

TABLE 2

| Power State | Description | Entry/Exit Triggers | Features Supported |
|---|---|---|---|
| Off | Fully powered down cf. phone powered off | battery is 0% explicit power down | n/a |
| Standby | Not actively used. Waiting for user input | no interaction for some time explicit user trigger | Display-off Input-wake listeners- hands (p1), voice (p0), stage (p0), HMD interaction (p0) Wifi/LTE-push notifications, data sync Location-fused location provider 60ghz |

TABLE 2-continued

| Power State | Description | Entry/Exit Triggers | Features Supported |
|---|---|---|---|
| Glance | Show notifications without fully waking up system | explicit user trigger wake keyword spotting fused location (implicit triggers) | Display-on, minimal UI |
| Location based/ vision-based discovery | Scanning for and displaying world-locked content (localized in a map) | proximity to content (implicit) "interesting" visual content | Display-on, full featured UX Hand tracking |

For example, child EPU 226 may facilitate an off state (e.g., fully powered down) for subsystem 550 of SoC 510A in which it resides. In this example, child EPU 226 may facilitate triggering the off state for SoC 510A when the battery is at 0% or if there is an explicit power down (e.g., powering off peripheral device 136 by pressing the power button).

As another example, child EPU 226 may facilitate a standby state, such as when a subsystem 550 of SoC 510A are not actively used and waiting for user input. For example, child EPU 226 may facilitate triggering the standby state for a subsystem 550 of SoC 510A when no interaction occurs for some time and the exit the standby state for a subsystem 550 of SoC 510A when there is an explicit user trigger. As one example, a subsystem 550 of SoC 510A may operate as a display controller for peripheral device 136. Child EPU 226 may place the subsystem 550 that controls the display of peripheral device 136 in standby mode when there are no user inputs to the peripheral device 136. User inputs may include a touch input to presence sensitive display (e.g., display 220), audio input (e.g., voice), interaction from HMD 112 (e.g., receiving a signal from HMD 112), and others. Child EPU 226 may cause the subsystem 550 exit standby mode for the display when user input is detected.

In yet another example, child EPU 225 may facilitate a glance state for subsystems 580 of SoC 530B. For example, child EPU 225 may facilitate showing notifications on the display 586 without fully waking up the system (e.g., minimal user interface). As one example, a subsystem 580 of SoC 530A may operate as a display controller for HMD 112. In some examples, child EPU 225 may trigger the glance state for that subsystem 580 of SoC 530A when an explicit user trigger, such as a movement of the device (e.g., signal detection from an accelerometer), wake keyword spotting, implicit triggers such as location, etc. Child EPU 225 may place the subsystem 580 of SoC 530A in glance mode when there is an explicit user trigger (e.g., notification), which may begin to communicate with SoCs 530B and 530C to provide a display with minimal user interface.

As another example, child EPU 226 may facilitate a location based or vision-based discovery state. For example, child EPU 226 may facilitate scanning for and display world-locked content (e.g., localized in a map). In some examples, child EPU 226 may trigger the location based or vision-based discovery state for a subsystem 550 of SoC 510A with an implicit trigger, such as when a user is in proximity to content. For example, a user may enter into a scene in the artificial reality content and may be in proximity to certain content in the scene that triggers the display of peripheral device 136 to turn on (e.g., to display content triggered from the user's proximity to the content in the scene). In other examples, hand tracking may be used to trigger location based or vision-based discovery state.

In these examples, parent EPU module 224 and child EPU modules 225 and 226 may manage power states based not only on explicit inputs, but implicit inputs, or a combination of both. Because the hierarchical power management is distributed, the power management decisions are taken in a distributed manner, such as child EPU 225 and 226 make specific power management decisions (e.g., execute sequences of steps to transition between power states in a power state machine configured to the specific subsystem, etc.), and parent EPU module 226 making other power management decisions (e.g., coordinating which subsystems are in which power states at any given time, etc.).

As described below, parent EPU 224 may include a power domain control (PDC) and a voltage/frequency control. The power domain controls manage the child EPUs 225 and 226 to arbitrate power management of subsystems 550 and 580 of SoCs 510 and 530. The voltage/frequency control manages the order of dynamic voltage and frequency scaling (DVFS) requests for subsystems 550 and 580 of SoCs 510 and 530. For example, parent EPU 224 may send/receive power requests or power status messages from child EPUs 225 and 226 and/or clock requests or clock status messages from child EPUs 225 and 226. Based on the power requests or power status messages, power domain control instructs a system microcontroller unit (SMCU) to run a power management driver, manage power domains and frequency of shared units, reprogram clocks, manage power management integrated circuit (PMIC) requests for voltage changes, power management or security interaction, manage top-level sub-system power domains, etc. The SMCU may communicate with platform components, such as skin temperature sensor, an ambient temperature senor and the PMICs using a data bus. The skin temperature sensor and ambient temperature sensor may monitor platform temperature and trigger an interrupt when the temperature of a component has reached a threshold temperature (e.g. to prevent overheating, etc.). In some examples, platform components may also include a battery gauge and over current monitor to monitor platform peak power conditions. Battery gauge and over current monitor may send an interrupt (e.g., general-purpose input/output (GPIO)) to parent EPU 224 of any change in power states. For example, battery gauge may send an interrupt when the battery is at 0% or other threshold to trigger an off state.

Figure 6:
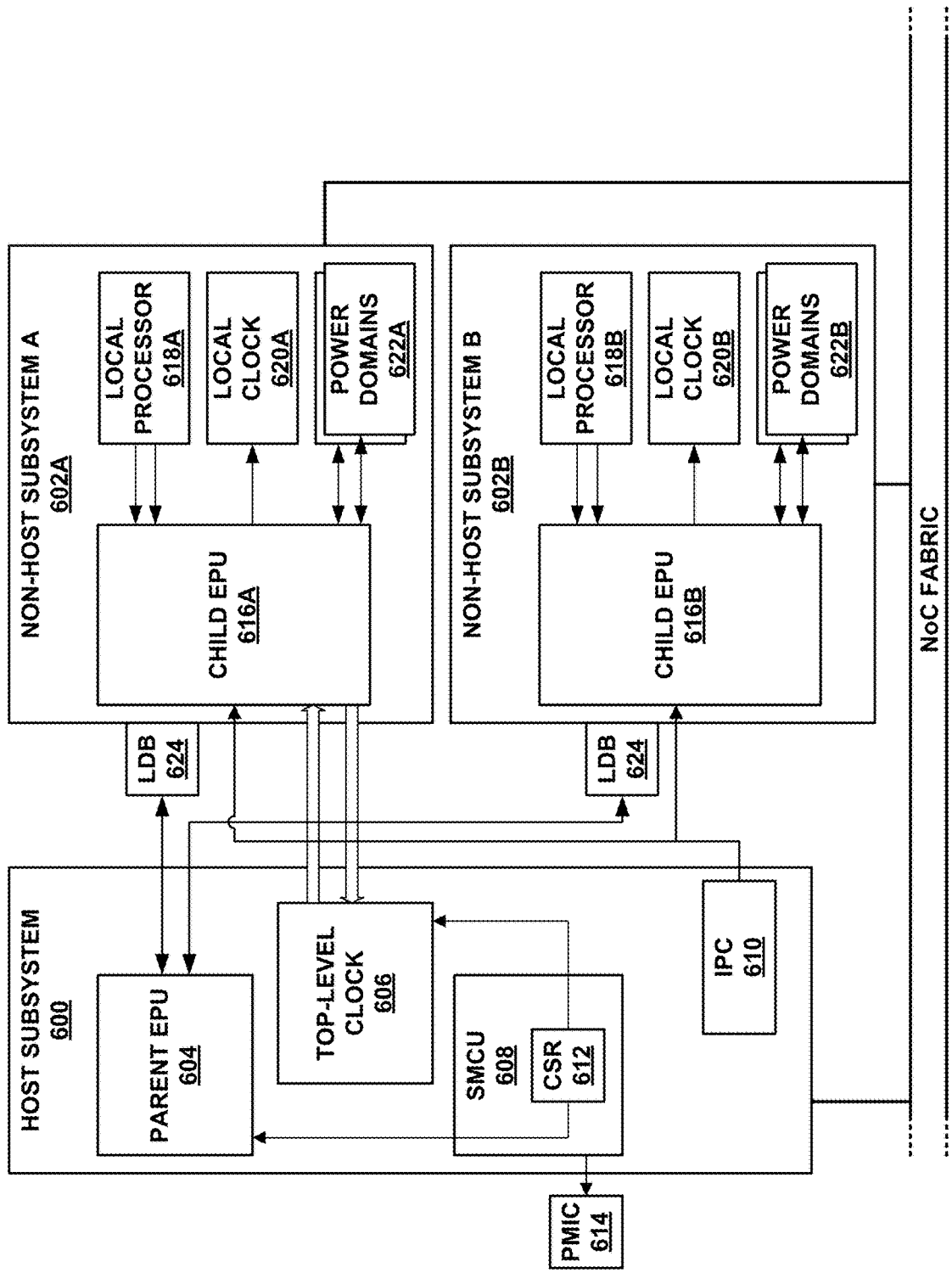
FIG. 6 is a block diagram illustrating a more detailed example implementation of hierarchical power management over a distributed architecture for a device of a multi-device artificial reality system, in accordance with techniques of this disclosure.

FIG. 6 is a block diagram illustrating a more detailed example implementation of hierarchical power management over a distributed architecture for a device of a multi-device artificial reality system. In the hierarchical power management, there is a parent EPU in a host system and a child EPU in each of the subsystems. This hierarchical organization allows distributed power management without a central power manager entity having to make all fine-grained power management decisions. In the illustrated example, the multi-device artificial reality system includes a host subsystem 600 and non-host subsystems 602A and 602B (collectively "non-host subsystems 602"). While only two non-host subsystems 602 are illustrated in FIG. 6, the multi-device artificial reality system may have any number of non-host subsystems 602. The host subsystem 600 may be, for example, a subsystem 582 of the head mounted display 112 of FIG. 5 above. The non-host subsystems 602A may include, for example, the SoCs 510 and 530 of FIG. 5 above.

In the illustrated example, the host subsystem 600 include parent EPU 604, top level clock (TCLK) 606, SMCU 608, and inter-process communication (IPC) module 610. Parent EPU 604, TCLK 606, SMCU 608, and IPC module 610 may comprise, for example, parent EPU module 224 of FIG. 5 above. The parent EPU 604 is responsible for signaling and sequencing of turning non-host subsystems 602 on and off. In the illustrated example, the parent EPU 604 controls top-level power gating of each non-host subsystem 602 using local domain block (LDB) 624. Each LDB 624 has a direct interface to an associated power domain and includes a sequence of steps associated with powering-up and powering-down the power domain. For example, LDB 624 includes a sequence of steps associated with powering-up and powering-down a power domain associated with child EPU 616. Additionally, in some examples, the parent EPU 604 controls the power domains within the host subsystem 600. TCLK 606 provides a master system clock.

SMCU 608 is a power management master controller that executes power management firmware. SMCU 608 is responsible for memory management, managing shared resources, managing platform resources and/or chip-level parameters, such as peak power and thermal issues. For example, SMCU 608 may implement chip-wide policies like thermal and peak power throttling SMCU 608 manages software-control of turning non-host subsystems 602 on and off. SMCU 608 includes a "software events interface" from control and status registers (CSR) 612 of SMCU 608 to parent EPU 604. SMCU 608 uses writes to CSR 612 to create events for parent EPU 604 to power up and power down non-host subsystems 602. SMCU 608 also uses writes to CSR 612 to control TCLK 606. SMCU 608 manages voltage changes to power management integrated circuits (PMIC) 614 (e.g., DC/DC converters and associated controllers, etc.). In some examples, SMCU 608 is the only controller that is able to cause PMIC 614 to change voltages. Additionally, SMCU 608 manages software-based management related to interactions with security subsystems.

Parent EPU 604 implements the hardware signaling and sequencing functionality to support SMCU 608. For example, parent EPU 604 may (a) wake-up subsystems from their lowest power states when the corresponding local processor is power gated, (b) arbitrate clock requests from each subsystem, and/or (c) Handle any signaling required for network-on-chip (NoC) power gating.

IPC 610 facilitates (e.g., though an IPC mailbox, etc.) power management related communications between one subsystem (e.g., non-host subsystem 602A) with another subsystem (e.g., non-host subsystem 602B).

In the illustrated example, the non-host subsystems 602 each include child EPUs 616A and 616B (collectively "child EPUs 616"), local processors (LMCU) 618A and 618B (collectively "local processors 618"), local clocks (LCLK) 620A and 620B (collectively "local clocks 620"), and one or more power domains 622A and 622B (collectively "power domains 622"). Child EPU 616, LMCU 618, and LCLK 620 may, for example, comprise child EPU modules 225 and 225 of FIG. 5 above. The child EPUs 616 control the power domains 622, block-level clock gating, subsystem clock requests, and mux select generation of LCLK 620. As described below, child EPUs 616 control power domains 622 using local LDB interfaces. Additionally, as described below, child EPUs 616 interface with TCLK 606 to send clock requests and receive clock acknowledgements. Local processors 618 create software-based events for the child EPUs 616 by writing to CSRs within the non-host subsystem 602. The local processors 618 also specifies per power domain clock requests.

Figure 7:
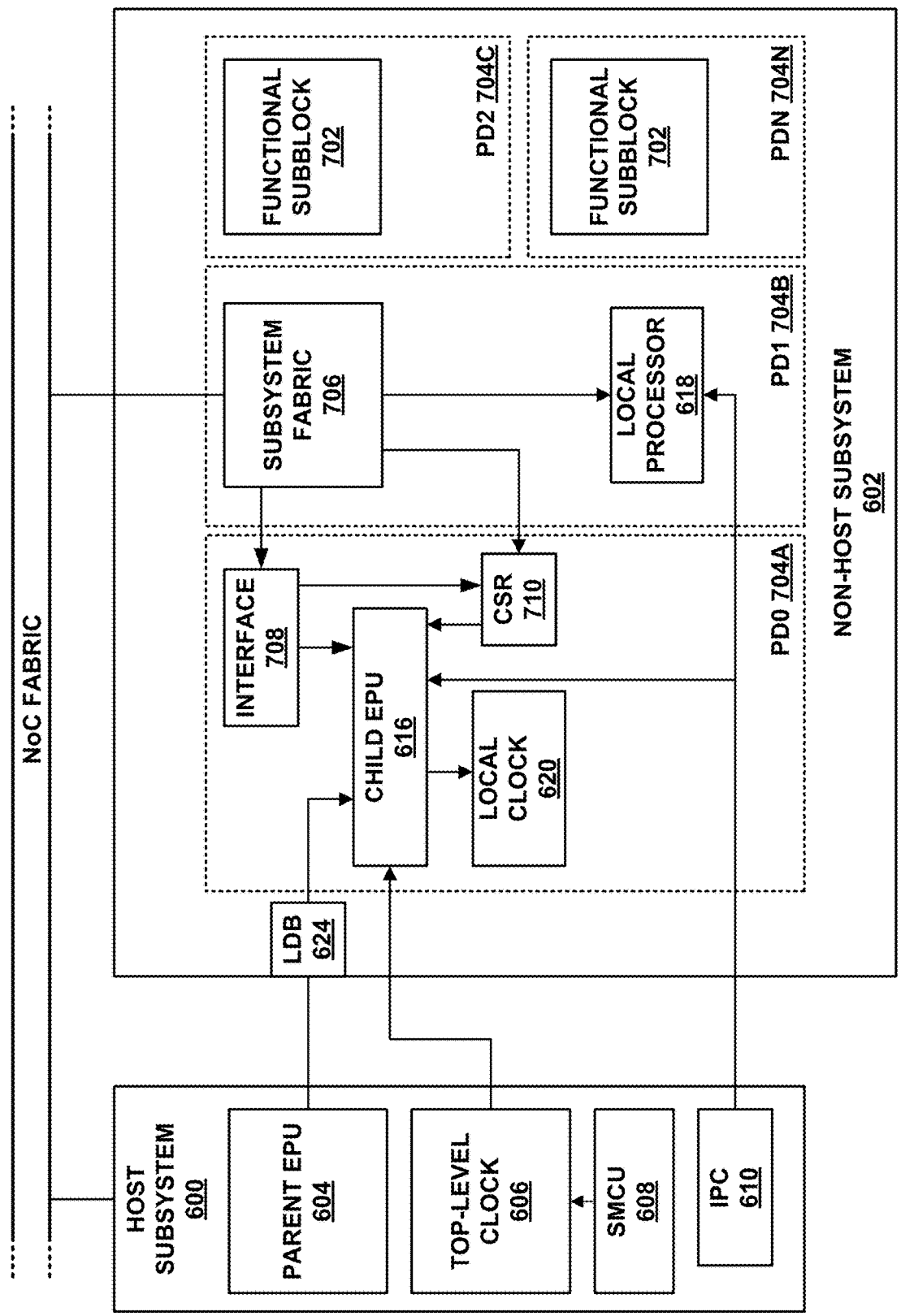
FIG. 7 is a block diagram illustrating a more detailed example of hierarchical power management including a parent energy processing unit (EPU) and a child EPU, in accordance with techniques of this disclosure.

FIG. 7 is a block diagram illustrating a more detailed example of hierarchical power management including parent EPU 604 and child EPU 616. The non-host subsystem 602 includes LMCU 618, various functional subblocks 702 that can be partitioned into various power domains (PDs) 704A-704N, and subsystem fabric 706. In some examples, subsystem fabric 706 include a network-on-chip (NoC) integrate circuit to facilitate communication between subsystems (e.g., communication with a mailbox of IPC 610) via NoC fabric between subsystems.

In the illustrated example, the subsystem 602 is split into logical power domains (PD0-PDN 704A-704N. In the illustrated example, PD0 704A includes child EPU 616, LCLK 620, an interface 708 (e.g., an advanced peripheral bus (APB) interface, etc.) between child EPU 616 and subsystem fabric 706, and subsystem CSR 710. In some examples, PD0 is not power-gated. In the illustrated example, PD1 704B includes LMCU 618 and the subsystem fabric 706. LMCU 618 generates events to initiate the power gating/ungating of the other power domains (e.g., PD2 through PDN). Firmware operating on LMCU 618 determines when one of functional subblocks 702 is required to perform a function. PD2 704C through PDN 704N represent more fine-grained power domains within subsystem 602. The number of such power domains may be different for each subsystem 602. Generally, functional subblocks 702 of logic within these power domains can be turned on and off together. For example, a graphics subsystem may have a scalar GPU within one functional subblock 702, a vector GPU within a different functional subblock 702. As another example, a tracking subsystem may have a DSP-accelerator combination for eye-tracking in one functional subblock 702 and a DSP-accelerator combination for hand-tracking in another functional subblock 702.

LMCU 618, through child EPU 616, manage which power domains (e.g., PD2-PDN 704C-704N) are to be power gated/ungated. LMCU 618 manages the power domains (PD2-PDN 704C-704N) by writing to corresponding registers in CSR 710. Depending on functionality required in a situation, LMCU 618 may write certain values to CSR 710 to cause child EPU 616 to manage a power state transition of a power domain from its current state to a desired state. This creates a software event that causes child EPU 616 to power the target power domain. Child EPU 616 sends interrupt to LMCU 618 to indicate completion of power-up sequence of the target power domain. Additionally or alternatively, child EPU 618 writes to a register in CSR 710 to indicates that the target domain has completed its power on sequence. LMCU 618 may also put itself into a self-sleep mode by writing a value to CSR 710 to cause child EPU 616 to power down PD1 704B (i.e., the power domain in which it resides). Additionally, LMCU 618 controls clocks and clock frequency through child EPU 616 via writes to registers of CSR 710. LCLK 620 supports clock muxes and predetermined dividers which are selected by child EPU 616 using clock requests.

Figure 8:
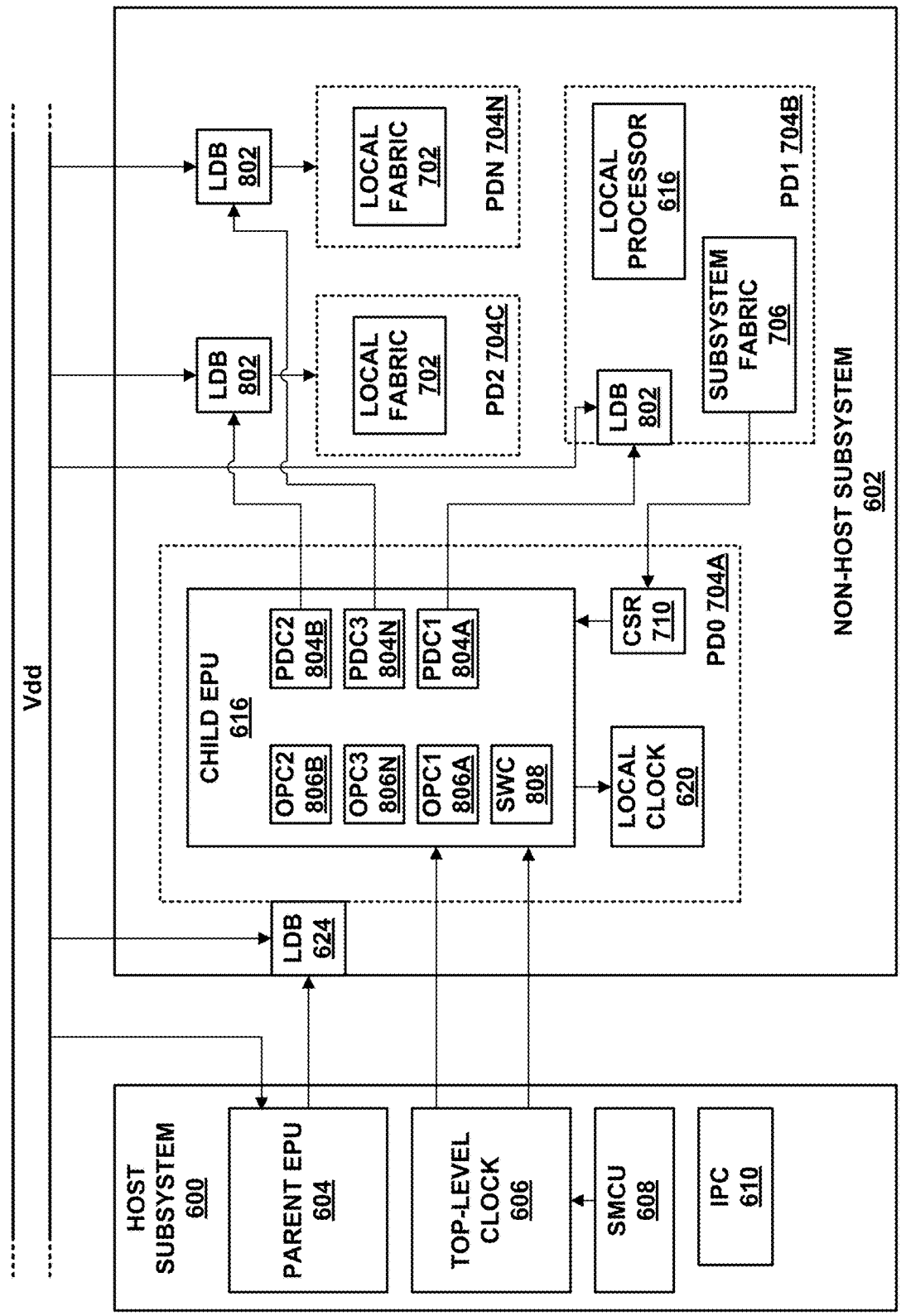
FIG. 8 is a block diagram illustrating a more detailed example of a child EPU controlling multiple power domains within one of the SoC integrated circuits, in accordance with techniques of this disclosure.

FIG. 8 is a block diagram illustrating a more detailed example of child EPU 616 controlling multiple power domains within one of the subsystems of the SoC integrated circuits (e.g., subsystem 602). LMCU 618, in conjunction with child EPU 616, controls power states of subsystem 602. LMCU 618 may include a state machine that determines which power domains (PD0-PDN 704A-704N) should be powered on and powered off based on implicit and/or explicit triggers. In the illustrated example, each power domain (PD0-PDN 704A-704N) includes an LDB 624 and 802. In the illustrated example, LDBs 624 and 802 are powered by a power rail (Vdd) (e.g., supplied by PMIC 614) and control the power gates for each power domain (PD0-PDN 704A-704N). LDBs 624 and 802 are configured with a sequence of steps to power on and power off the associated power domain (PD0-PDN 704A-704N). Because LDBs 624 and 802 are local to the subsystem 602, power on and power off sequences can be designed for each functional block 702 without the parent EPU 604 having knowledge of any specific sequence. Each LDB 802 is associated with a power domain control (PDC) 804A-804N of child EPU 616. PDCs control an overall sequence of power gating/ungating phases while the LDBs execute a series of actions for each phase. Each power domain (PD0-PDN 704A-704N) is associated with an open platform communication (OPC) module 806A-806N to handle per-domain clock requests in conjunction with TCLK 606.

To power on a target power domain, for example, LMCU 618 writes to power registers of CSR 710 corresponding to the target power domain. This creates a software event in child EPU 616 to turn on the target power domain. The child EPU 616, via the corresponding PDC of the target domain, goes through a full power-up sequence, including enabling clocks and releasing resets. When the sequence is completed, child EPU 616 indicates that the target power domain is powered up (e.g., via an interrupt to LMCU 618, via a write to a corresponding register in CSR 710, etc.). When multiple power domains need to be turned on, the LMCU 618 may do this in parallel or serially.

PDC 804A-804N and OPC 806A-806N facilitate fine-grained power control of the functional subblocks 702 of the subsystem 602. PDCs receive event inputs from various sources (e.g., via CSR 710 writes) and, based on the input, (a) determine a final state to which the associated power domain needs to be transitioned, (b) coordinate with the associated LDB to enable this transition, and (c) handle situations that may interrupt the power state transition (such as a signal to abort the transition). A software control (SWC) 808 acts on writes by LMCU 618 to CSRs 710 (e.g., a power CSR and a clock control CSR, etc.) to determine when to control the power and clocks of the various power domains.

Child EPU 616 uses PDC 804A-804N to control power gating to PD1 704B to PDN 704N, while power gating of PD0 704A is controlled by parent EPU 604. When a subsystem is powered on, PD0 704A is the first power domain to be powered on. Child EPU 616 resets LMCU 618 (e.g., via PDC 804A). When LMCU 618 is reset, child EPU 616 coordinates with LMCU 618 to power up the other power domains 704C-704N and manages block level clock gaiting (e.g., turning clocks on for an entire power domain, etc.). When a subsystem is powered off, PD0 704A is the last power domain to be powered off. Child EPU 616 coordinates with LMCU 618 to power down the other power domains 704C-704N and manages block level clock gaiting (e.g., turning clocks off for an entire power domain, etc.). Child EPU 616 then powers down the LMCU 618 (e.g., via PDC 804A, etc.). Child EPU 616 then signals that it is ready to be powered down.

Table 3 below includes example interactions between the components in FIGS. 6, 7, and 8 to manage the power states of the subsystem 602.

| Interaction | Source | Destination | Description |
| --- | --- | --- | --- |
| SMCU → Parent EPU | Host Subsystem CSR | Parent EPU | SMCU writes CSRs within the HOST subsystem. These CSR writes create SW events that cause the parent EPU manage one or more child EPUs |
| SMCU ↔ LMCU (via NoC) | SMCU | CSR of LMCU | SMCU can access subsystem LMCU CSR |
| LMCU → LMCU | Initiator LMCU | IPC | One subsystem LMCU talks to another subsystem LMCU through the IPC |
| LDB ↔ Power Domain | LDB | Target Power Domain (PDx) | Each LDB includes a specific interface with its associated power domain to specify powering on and off that specific power domain |
| PDC ↔ LDB | PDC | LDB | PDC communicates with an asynchronous handshake to control the LDB |
| Child EPU SWC | Subsystem CSR | Event Interface | LMCU uses a power CSR and a clock control CSR to cause an event to cause the child EPU to control the power and clocks of the various power domains. |
| Local Clock Control | Child EPU | LCLK | Child EPU drives LCLK mux selects |
| EPU Clock | | | The child EPU has a direct connection to a low frequency clock of the TCLK. |
| EPU Reset | | | The host subsystem reset signal is connected the EPUs to drive a resto to each power domain as part of a power gating/ungating sequence. |

Figure 9:
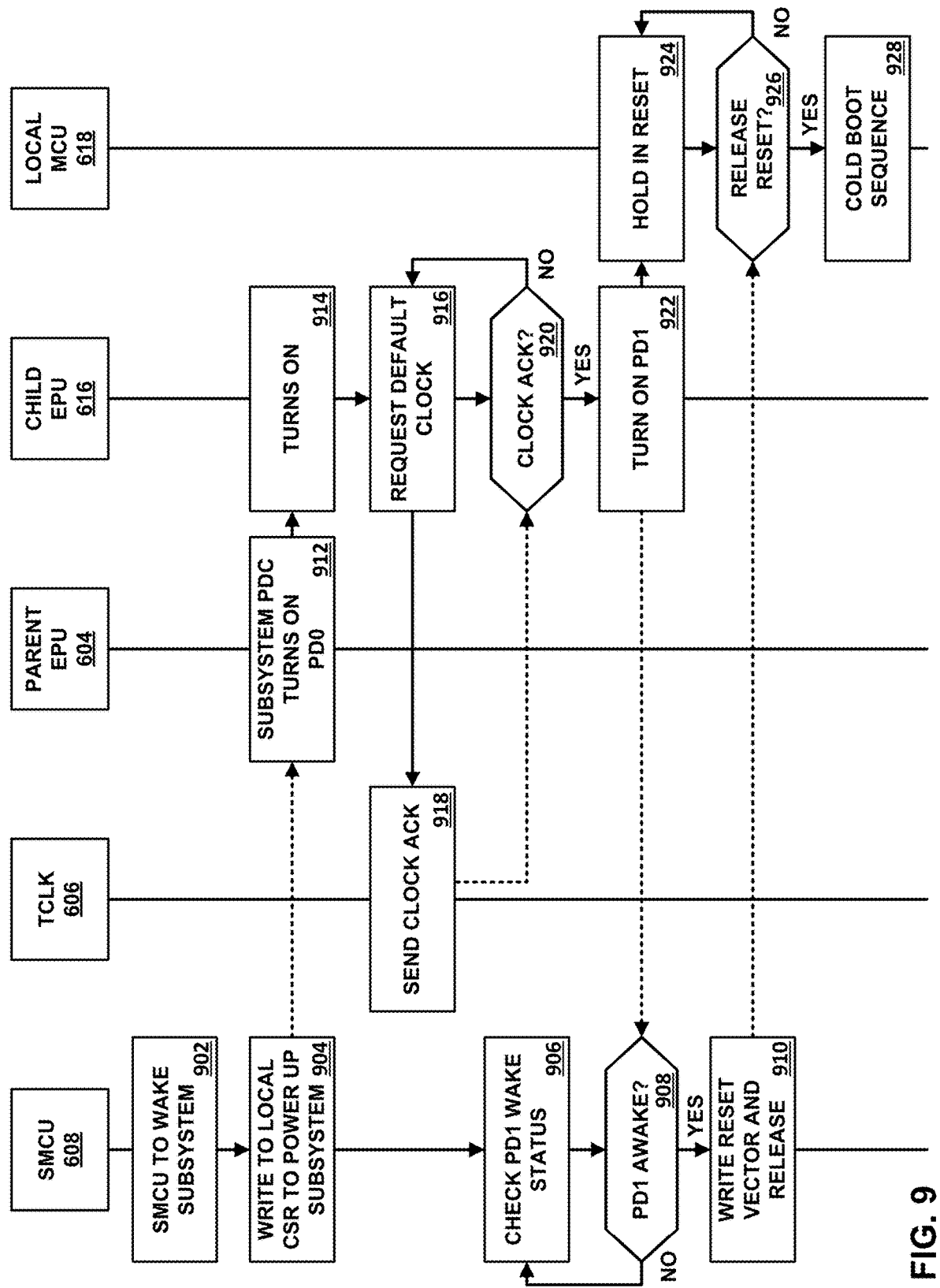
FIG. 9 is a flow diagram illustrating an example sequence to boot an SoC integrated circuit using hierarchical power management, in accordance with techniques of this disclosure.

FIG. 9 is a flow diagram illustrating an example sequence to boot an SoC integrated circuit using hierarchical power management. Initially, SMCU 608 determines what subsystems 602 are to be powered up (902). SMCU 608 writes values to CSR 612 indicative of which subsystem is to be powered up (904). This causes a software event to parent EPU 604. SMCU 608 checks the wake status of PD1 704B of the subsystem (906). SMCU 608 waits until PD1 704B is awake (block 908) When PD1 704B of the subsystem is awake (YES at 908), SMCU 608 writes a reset vector and release to the child EPU 616 (910). Parent EPU 604, via the associated LDB 624, turns on PD0 704A of the subsystem 602 of interest (912).

As a result, child EPU 616 powers up (914). Child EPU 616 requests the default clock from TCLK 606 (e.g., via a clock req, etc.) (916). TCLK 606 responds with a clock acknowledgement (e.g., via a clock ack, etc.) (918). Meanwhile, child EPU 616 waits for the clock acknowledgement (920). After receiving the clock acknowledgement (YES at 920), child EPU 616 turns on PD1 704B (e.g., via PDC 804A) (922). SMCU 608 reads the power status of LMCU 618 to determine that PD1 is ungated. LMCU 618 holds in reset (924). LMCU 618 waits until the release for LMCU 618 is reset (926). Subsequently, LMCU 618 initiates a cold boot sequence (928).

Figure 10:
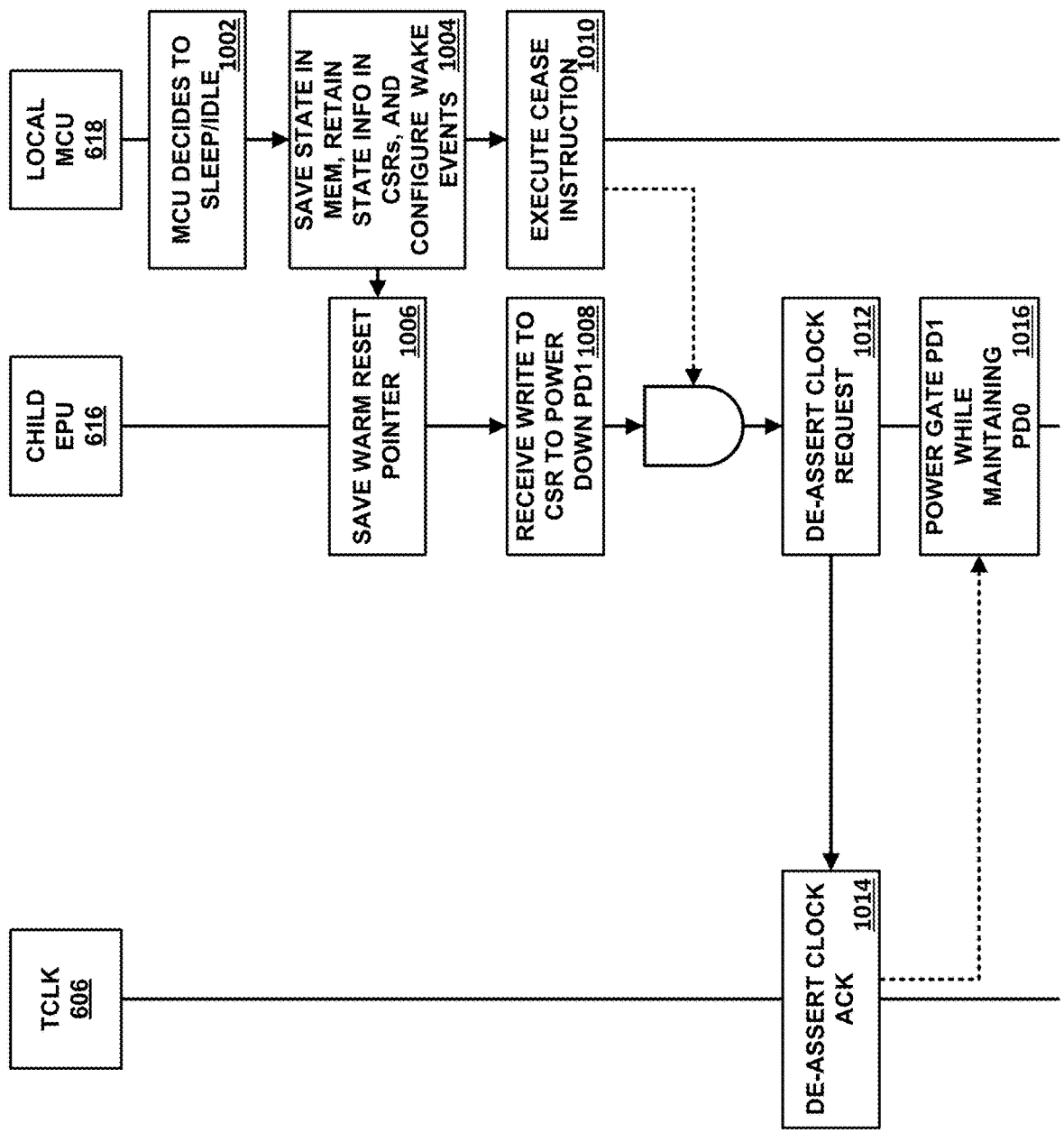
FIG. 10 is a flow diagram illustrating an example sequence for an SoC integrated circuit to initiate a sleep mode, in accordance with techniques of this disclosure.

FIG. 10 is a flow diagram illustrating an example sequence for an SoC integrated circuit (e.g. the SoCs 510 and 530 of FIG. 5 above) to initiate a sleep mode. Initially, after LMCU 618 has powered down the other power domains (e.g., PD2-PDN 704C-704N), LMCU 618 decides to enter a sleep mode (1002). LMCU 618 saves its current state (e.g., the content of its registers, etc.) into static memory (1004). For example, (a) firewall, reset vector, and any security related registered are saved in retention flops, (b) control and status registers of LMCU 618 are saved to Data Tightly Integrated Memory (DTIM) or Instruction Tightly Integrated Memory (ITIM), and (c) DTIM or ITIM is retained. In some example LMCU 618 also saves, in static memory, the state of one or more registers in CSR 710. LMCU 618 also configures wake up events that it can be woken up upon. Child EPU 616 saves a warm reset point for LMCU 616 (1006). MCU writes to a register in CSR 710 to indicate that the power domain associated with LMCU 618 (e.g., PD1 704B) can be powered down (1008). Additionally, LMCU 618 performs a CEASE instruction, and, when the instruction in complete, asserts a signal from the power domain (1010). When CS and the CEASE signal is received, child EPU 616 sends a de-assert clock request (1012). TCLK 606 sends a de-assert clock acknowledgement (1014). In response, child EPU 616 power gates the power domain (e.g., PD1 704B) while maintain power to its power domain (e.g. PD0 704A) (1016).

Figure 11:
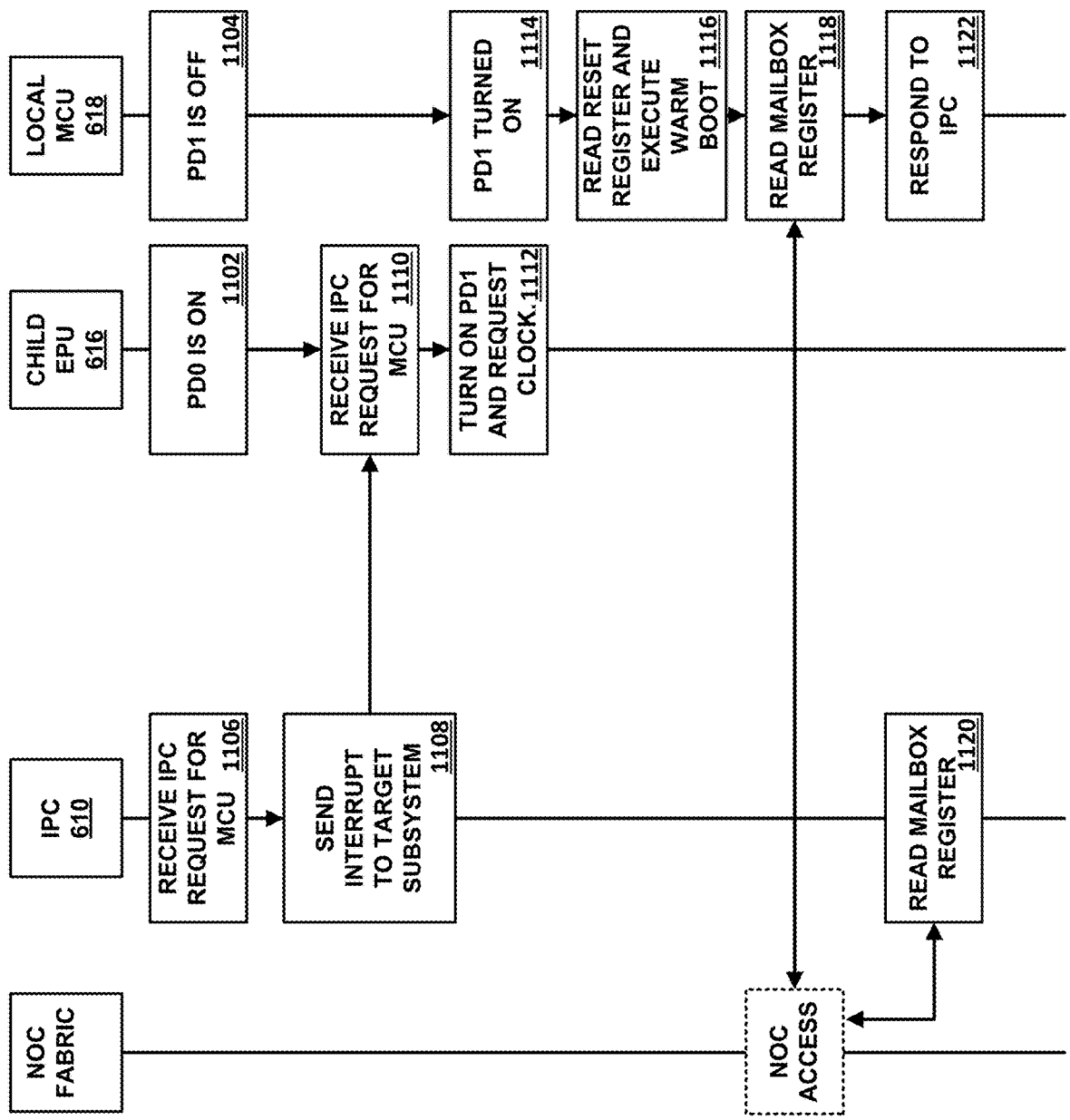
FIG. 11 a flow diagram illustrating an example method for an SoC integrated circuit to wake from a sleep mode, in accordance with techniques of this disclosure.

FIG. 11 a flow diagram illustrating an example method for an SoC integrated circuit to wake from a sleep mode. Initially, PD0 704A is no power gated (1102) and PD1 704B is power gated (1104). IPC 610 receives a request for LMCU 618 (1106). For example, another a trigger from another subsystem may cause a request to take up LMCU 618. IPC 610 sends an interrupt to the target subsystem (1108). Child EPU 616 of the target subsystem receives a hardware event to turn on PD1 704B (1110). Child EPU 616 turns on PD1 704B, via PDC1 804A, and request the clock (e.g., from TCLK 606) (1112). PD1 704B is turned on (1114). LMCU 618 reads the reset register and executes a warm boot (1116). LMCU 618 reads the mailbox register of IPC 610, via the NoC fabric (1118 and 1120). The mailbox register of IPC 610 may contain, for example, information relating to why LMCU 618 was woken. LMCU 618 responds to IPC 610 (1122).

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

What is claimed is:

1. An artificial reality system comprising:
a device comprising one of a peripheral device configured to generate artificial reality content for display or a head-mounted display unit (HMD) configured to output artificial reality content,
wherein the device comprises a host subsystem, a plurality of subsystems, and an inter-process communication (IPC) module connected to each of the subsystems,
wherein each subsystem of the plurality of subsystems includes a local processor and a child energy processing unit (EPU) connected to the local processor, each child EPU configured to manage power states for the child EPU's respective subsystem,
wherein each local processor is configured to communicate with the local processor of other subsystems of the plurality of subsystems via the IPC module and to request changes in the power state of another subsystem via one or more requests transferred through the IPC module, and
wherein the host subsystem comprises a parent EPU configured to direct power management of each of the child EPUs.

2. The artificial reality system of claim 1, wherein the parent EPU includes a power domain control (PDC), wherein the PDC arbitrates power management between child EPUs.

3. The artificial reality system of claim 1, wherein transitions between the power states are initiated based on at least one of an explicit input or implicit input.

4. The artificial reality system of claim 3, wherein the explicit input comprises at least one of the one or more inputs from a user, wherein the one or more inputs from the user comprises a voice command, a touch of a presence-sensitive surface of the peripheral device, a touch of a physical button of the peripheral device, or a touch of a physical button of the HMD.

5. The artificial reality system of claim 3, wherein the implicit input comprises at least one of a proximity of a user to the artificial reality content or a movement of a hand of the user relative a location of the artificial reality content.

6. The artificial reality system of claim 1, wherein each subsystem of the plurality of subsystems includes a plurality of power domains and wherein the child EPU included in the subsystem separately controls each of the plurality of power domains of the respective subsystem.

7. The artificial reality system of claim 6, wherein the child EPU included in each subsystem is configured to execute sequences to power up and power down each of the plurality of power domains in the respective subsystem.

8. The artificial reality system of claim 1, wherein the parent EPU includes voltage/frequency control, wherein the voltage/frequency control manages dynamic voltage and frequency scaling requests from child EPUs.

9. The artificial reality system of claim 1, wherein the host subsystem includes a power management master controller executing power management firmware, wherein the power management master controller implements device-wide policies for power management.

10. The artificial reality system of claim 1, wherein the device is the HMD and the artificial reality system further comprises a peripheral device including a plurality of subsystems, each of the plurality of subsystems of the peripheral device including a child EPU, wherein the parent EPU of the HMD controls the child EPUs of the subsystems of the peripheral device.

11. The artificial reality system of claim 1, wherein the device is the peripheral device and the artificial reality system further comprises an HMD including a plurality of subsystems, each of the plurality of subsystems of the HMD including a child EPU, wherein the parent EPU of the peripheral device controls the child EPUs of the subsystems of the HMD.

12. A method comprising:
outputting, by a head mounted display (HMD) of an artificial reality system, artificial reality content, the HMD including a host subsystem, a plurality of non-host subsystems and an inter-process communication (IPC) module connected to each of the plurality of non-host subsystems, wherein each of the non-host subsystems includes a local processor and a child energy processing unit (EPU) connected to the local processor;
managing, via each child EPU, power states for respective subsystems of the HMD, wherein managing includes communicating with the local processor of other non-host subsystems via the IPC module to request changes in the power state of another non-host subsystem via one or more requests transferred to the other non-host subsystem through the IPC module; and
directing, by a parent energy processing unit, power management of the child energy processing units to manage power of the artificial reality system.

13. The method of claim 12, wherein managing, via the child EPU of each non-host subsystem, power states for respective subsystems of the HMD further includes managing a sequence of steps to transition into a target power state.

14. The method of claim 12, wherein each of the subsystems are split into a plurality of power domains and wherein managing the power states comprises controlling each of the plurality of power domains separately.

15. The method of claim 14, wherein controlling each of the plurality of power domains further comprises executing, by the corresponding child EPU, a sequence to power up and power down each of the plurality of power domains.

16. A non-transitory computer-readable storage medium comprising instructions that, when executed, configure an artificial reality system to:
output, by a head mounted display (HMD) of the artificial reality system, artificial reality content, the HMD including a host subsystem, a plurality of non-host subsystems and an inter-process communication (IPC) module connected to each of the plurality of non-host subsystems, wherein each of the non-host subsystems includes a local processor and a child energy processing unit (EPU) connected to the local processor;
manage, via each child EPU, power states for respective subsystems of the HMD, wherein managing includes communicating with the local processor of other non-host subsystems via the IPC module to request changes in the power state of another non-host subsystem via one or more requests transferred to the other non-host subsystem through the IPC module; and
direct, by a parent energy processing unit, power management of the child EPUs to manage power of the artificial reality system.

17. The computer-readable storage medium of claim 16, wherein to direct, by the parent EPU, power management of the one or more child EPUs, the instructions further cause the artificial reality system to direct the one or more child EPUs to enter one of an off state, a standby state, an on state, a glance state, a location-based state, or a vision-based state.

18. The computer-readable storage medium of claim 16, wherein to manage, by the one or more child EPUs, the power states for the respective subsystems of the HMD, the instructions further cause the artificial reality system to manage a sequence of steps to transition into a target power state.

19. The computer-readable storage medium of claim 16,
wherein each of the subsystems are split into a plurality of power domains, wherein managing the power states comprises controlling each of the plurality of power domains separately, and
wherein controlling each of the plurality of power domains further comprises executing, by the corresponding child EPU, a sequence to power up and power down each of the plurality of power domains.

* * * * *